(12) United States Patent
Thompson et al.

(10) Patent No.: US 7,172,677 B2
(45) Date of Patent: *Feb. 6, 2007

(54) METHOD FOR INHIBITING CALCIUM SALT SCALE

(75) Inventors: Jacob Owen Thompson, St. Louis, MO (US); Sheldon Phillip Verrett, Olivette, MO (US); Steven John Severtson, Shoreview, MN (US); Jeremy E. Loy, Vernon Hills, IL (US)

(73) Assignee: Solutia Inc., St. Louis, MO (US)

( * ) Notice: Subject to any disclaimer, the term of this patent is extended or adjusted under 35 U.S.C. 154(b) by 204 days.

This patent is subject to a terminal disclaimer.

(21) Appl. No.: 10/895,589

(22) Filed: Jul. 21, 2004

(65) Prior Publication Data

US 2004/0256070 A1  Dec. 23, 2004

Related U.S. Application Data

(62) Division of application No. 10/164,100, filed on Jun. 5, 2002, now abandoned.

(60) Provisional application No. 60/296,316, filed on Jun. 6, 2001.

(51) Int. Cl.
  D21C 9/00 (2006.01)
  D21C 11/00 (2006.01)
  C02F 5/14 (2006.01)

(52) U.S. Cl. ............... 162/80; 162/29; 162/30.11; 162/48; 252/175; 252/181

(58) Field of Classification Search ........ 162/29, 162/31, 32, 38, 48, 76, 158, 70, 80, 72; 252/175, 252/180, 181; 422/13; 210/696–700
See application file for complete search history.

(56) References Cited

U.S. PATENT DOCUMENTS

| | | | |
|---|---|---|---|
| 3,434,969 A * | 3/1969 | Ralston ............ 210/700 |
| 3,448,003 A | 6/1969 | Merriman et al. |
| 3,621,081 A * | 11/1971 | Prentice ............ 558/155 |
| 3,979,385 A | 9/1976 | Wollmann et al. |
| 4,006,182 A | 2/1977 | Ploger et al. |
| 4,056,430 A * | 11/1977 | Hoeger et al. ........ 162/76 |
| 4,253,912 A * | 3/1981 | Becker et al. ........ 162/76 |
| 4,406,811 A * | 9/1983 | Christensen et al. ...... 252/180 |
| 4,631,131 A | 12/1986 | Culsia et al. |
| 4,735,787 A | 4/1988 | Mouche et al. |
| 4,799,995 A | 1/1989 | Crump et al. |
| 4,851,082 A | 7/1989 | Mita et al. |
| 4,851,490 A | 7/1989 | Chen et al. |
| 4,857,490 A | 8/1989 | Johnson |
| 4,872,996 A | 10/1989 | Grierson et al. |
| 4,919,845 A | 4/1990 | Vogt et al. |
| 5,002,126 A | 3/1991 | Carlberg et al. |
| 5,087,376 A | 2/1992 | Bendiksen et al. |
| 5,094,304 A | 3/1992 | Briggs |
| 5,221,487 A | 6/1993 | Carter |
| 5,261,491 A | 11/1993 | Stewart et al. |
| 5,306,392 A | 4/1994 | Mita |
| 5,320,757 A | 6/1994 | Zidovec et al. |
| 5,358,640 A | 10/1994 | Zeiher et al. |
| 5,433,886 A | 7/1995 | Sherbondy et al. |
| 5,441,602 A | 8/1995 | Harris et al. |
| 5,449,476 A * | 9/1995 | Sherbondy et al. ........ 252/180 |
| 5,490,942 A | 2/1996 | Kuczynski |
| 5,534,157 A | 7/1996 | Iman et al. |
| 5,552,018 A | 9/1996 | Devenyns |
| 5,560,862 A | 10/1996 | Gosselink et al. |
| 5,562,830 A | 10/1996 | Zidovec et al. |
| 5,580,462 A | 12/1996 | Gill |
| 5,635,104 A | 6/1997 | Kott et al. |
| 5,709,814 A | 1/1998 | Gill |
| 5,772,913 A | 6/1998 | Gill et al. |
| 5,788,857 A | 8/1998 | Yang et al. |
| 6,123,869 A | 9/2000 | Lawson et al. |
| 6,210,600 B1 | 4/2001 | Zhou et al. |
| 6,355,214 B1 | 3/2002 | Fader et al. |
| 6,572,789 B1 | 6/2003 | Yang et al. |
| 6,641,754 B2 | 11/2003 | Buentello et al. |
| 6,869,503 B2 * | 3/2005 | Thompson et al. ........ 162/80 |
| 6,890,404 B2 * | 5/2005 | Thompson et al. ........ 162/80 |
| 2002/0071783 A1 * | 6/2002 | Fader et al. ............ 422/13 |
| 2003/0010458 A1 | 1/2003 | Thompson et al. |
| 2003/0075290 A1 | 4/2003 | Thompson et al. |

FOREIGN PATENT DOCUMENTS

| CA | 1069800 | 1/1980 |
|---|---|---|
| DE | 3537808 | 4/1987 |

OTHER PUBLICATIONS

Windhager, R.H., An Effective Sequestrant for Use in Controlling Digester Scale; Paper Trade Journal, pp. 42-44, Nov. 5, 1973.

* cited by examiner

*Primary Examiner*—José A. Fortuna
(74) *Attorney, Agent, or Firm*—Blackwell Sanders Peper Martin LLP; Mark F. Wachter

(57) ABSTRACT

Compositions and method for improving inhibition of calcium salt scale formation under the conditions found in chemical pulp processes in which an effective amount of selected phosphonates or phosphonate blends is admixed with the aqueous digester composition in a chemical pulping process during the digestion stage. The compositions and method are especially well suited for use in the Kraft pulping process.

51 Claims, No Drawings

METHOD FOR INHIBITING CALCIUM SALT SCALE

CROSS-REFERENCE TO RELATED APPLICATIONS

This application is a division of application Ser. No. 10/164,100 filed Jun. 5, 2002 now abandoned which is a non-provisional application which claims the priority of prior provisional application Ser. No. 60/296,316, entitled "Method for Inhibiting Calcium Salt Scale," filed Jun. 6, 2001, which prior applications are hereby incorporated by reference into this application.

FIELD OF THE INVENTION

This invention relates to compositions and methods for inhibiting scale formation in aqueous alkaline systems of chemical pulping processes. More particularly, this invention relates to compositions and methods for inhibiting formation, deposition and adherence of calcium salt scale deposits in chemical pulping process equipment.

BACKGROUND OF THE INVENTION

Paper is widely used worldwide in commerce and in homes and has a variety of uses. Pulp making is thus carried out on a large industrial scale worldwide to produce sufficient quantities of paper. Accordingly it is highly desirable that such pulp making operations be carried out in a cost effective, efficient operation with minimum manufacturing equipment downtime and minimum periods of reduced pulp making process equipment efficiency.

The basic steps in industrial pulp making are to convert plant fiber into chips, convert chips into pulp, (optionally) bleach the pulp, wash the pulp, and transform the pulp into suitable paper which can be used in paper products such as writing paper, newsprint and paper for documents.

Typically, several chemical pulping processes are used in industrial pulp making operations. Well known industrial alkaline chemical pulping processes include the Kraft (or sulfate), soda and alkaline sulfite processes. The Kraft process makes the strongest fibers of any pulp producing process and is the most commonly used pulp making process in part due to its efficient recovery process for the cooking chemicals. While the present invention has applicability to any of the above alkaline chemical pulping processes, it is particularly useful with the Kraft process and, as such, the Kraft process is described in more detail below.

Initially, suitable trees are harvested, debarked and then chipped into suitable size flakes or chips. These wood chips are sorted with the small and the large chips being removed. The remaining suitable wood chips are then charged to a digester (which is a vessel or tank for holding the chips and an aqueous digesting composition, such tanks can be designed for either batch or continuous operation).

Illustratively, in a batch type digester, wood chips and a mixture of "weak black liquor," the spent liquor from a previous digester cook, and "white liquor," a solution of sodium hydroxide and sodium sulfide, that is either fresh or from the chemical recovery plant, is pumped into the digester. In the cooking process lignin, which binds the wood fiber together, is dissolved in the white liquor forming pulp and black liquor.

The digester is sealed and the digester composition is heated to a suitable cook temperature under high pressure. After an allotted cooking time at a particular temperature and pressure (H-factor) in the digester, the digester contents (pulp and black liquor) are transferred to a holding tank. The pulp in the holding tank is transferred to brown stock washers while the liquid (black liquor formed in the digester) is sent to the black liquor recovery area, i.e. black liquor evaporators. The black liquor is evaporated to a high solids content, usually 60–80% solids, using a multiple effect evaporator, for example. The higher the solids content, the more difficult it is to pump the black liquor and the more scale problems the pulp mill will have. One of the most troublesome is calcium carbonate scale which forms in various areas of the pulp mill, including the digester, the black liquor evaporator area, and the brown stock washing area.

Most commercial paper mills use multiple effect evaporators (MEE) as the black liquor evaporators. These evaporators generally range from four to eight effects in length. Generally, undesirable calcium carbonate scaling occurs in only one or two effects. Currently, most mills do not use any scale inhibitor but rather contend with the scale problem by shutting down the black liquor evaporator section and washing out the calcium carbonate scale with hot acid, i.e. acid cleaning. This hot acid boil out adversely affects papermill production and is a concern because the acid used is corrosive to mill piping and equipment.

The Kraft cook is highly alkaline, usually having a pH of 10 to 14, more particularly 12 to 14. The digester composition contains a large amount of sodium sulfide, which is used as an accelerant to increase the delignification rate of the cook. This works to release the lignin in the wood chips and thus the cellulose becomes available as pulp.

The combination of operating conditions in the Kraft process is conducive to scale formation and deposition and increases the propensity of the calcium carbonate scale to form, deposit and adhere to metallic and other surfaces within which it comes in contact. Under such process conditions, calcium present in the water and leached from the wood in the Kraft process can react with carbonate and produce rather rapid scaling with the deposition of calcium carbonate scale. Such scale is frequently deposited in the digester, piping, heat exchangers etc., all of which have surfaces on which the calcium carbonate can deposit and adhere. Such deposition builds up over time and can result in undesirable premature shutdowns downstream on the pulp making manufacturing line to remove scale deposits by hot acid washing.

Several patents and a technical article disclose problems of scaling. In "An Effective Sequestrant For Use In Controlling Digester Scale," R. H. Windhager, Paper Trade Journal, pp. 42–44, Nov. 5, 1973, the use of small quantities of mono-aminomethylene phosphonic acid (ATMP) as a calcium carbonate scale inhibitor in a digester to inhibit scale deposition from the digester cooking liquor is disclosed.

U.S. Pat. No. 4,799,995 (issued to Druce K Crump et al. on Jan. 24, 1989) discloses that inhibition of calcium scale under conditions found in pulp digesters has been accomplished by employing mixtures of polyamino(polyalkylenephosphonic) acids with non-ionic surfactants added to the pulp liquor. This U.S. patent also discloses that phosphonates such as nitrilotris(methylenephosphonic acid) ("NTMP" or "ATMP"), 1-hydroxyethane-1,1-diphosphonic acid ("HEDP") and sodium 1-hydroxyethane-1,1-diphosphonate ("NaHEDP") are said to have been commonly used to control scale. However, the '995 patent discloses that the use of HEDP in black liquor actually promoted scale and use of diethylenetriamine penta(methylenephosphonic acid)

("DTPMP") in black liquor without the presence of a nonionic surfactant resulted in only limited scale reduction. While the '995 patent discloses the use of nonionic surfactants to improve scale reduction, it is preferred to avoid the use of surfactants in chemical pulp processes, particularly in the digester. The compositions of the present invention when added to an alkaline chemical pulp process digester are effective at inhibiting calcium salt scale in chemical pulp processes without the need for a nonionic surfactant.

Canadian Patent No. 1,069,800 (Philip S. Davis et al., Jan. 15, 1980) discloses the addition of blends of organophosphonates, e.g. 1-hydroxyethylidene-1,1-diphosphonic acid (HEDP), with amino-organo phosphonates, e.g. amino tri (methylenephosphonic acid) (AMP), ethylenediamine tetra (methylenephosphonic acid) (EDTPA) and hexamethylenediamine tetra(methylenephosphonic acid) (HMDTA), to black liquor to reduce calcium carbonate scale in a black liquor evaporator system at a pH above 9. This patent also discloses that use of individual (single) phosphonates, instead of the disclosed blends, were not effective at a pH above 9 to inhibit calcium carbonate crystallization.

U.S. Pat. No. 4,851,490 (issued to Fu Chen et al. on Jul. 25, 1989) discloses water soluble polymers containing hydroxyalkyleneaminoalkylene phosphonate functions which are said to have utility as deposit control agents effective in a number of water systems such as cooling, boilers, conversion coating, paper and pulp processing and gas scrubbing.

U.S. Pat. No. 5,534,157 (issued to Craig D. Iman et al. on Jul. 9, 1996) discloses a method for inhibiting the formation, deposition and adherency of scale-forming salts in process waters at high pH utilizing polyether polyamine methylene phosphonates. At column 4, lines 35–51 thereof, this U.S. patent discloses that inhibitors such as HEDP and ATMP are useless as scale inhibitors at alkaline pH conditions.

U.S. Pat. No. 5,562,830 (issued to Davor F. Zidovec et al. on Oct. 8, 1996) discloses a method of inhibiting corrosion and scale formation and deposition in aqueous systems by adding a combination of a polyepoxysuccinic acid or salts thereof and a phosphonocarboxylic acid or salts thereof.

U.S. Pat. No. 5,552,018 (issued to Johan Devenyns on Sep. 3, 1996) discloses a process in which a peroxyacid is employed to improve the selectivity of the delignification of a chemical paper pulp that has already undergone a delignifying treatment in the presence of chemical reagents, i.e. a Kraft cook. Phosphonates are disclosed as stabilizers in this process.

Despite the aforementioned patents and technical article, enhanced methods and compositions for inhibiting the formation, deposition and adherence of scale to metallic surfaces particularly in commercial chemical pulp processing equipment is highly desired.

SUMMARY OF THE INVENTION

It is an object of this invention to provide a composition for inhibiting the formation, deposition and adherence of calcium salt scale to metallic and other surfaces in the equipment, vessels and/or piping of a chemical pulp process facility. It is yet another object of this invention to provide a method for inhibiting the formation, deposition and adherence of calcium salt scale to surfaces in the equipment, vessels and/or piping of a chemical pulp process facility.

These and other objects are achieved in the invention which is described in more nonlimiting detail hereinafter.

According to the invention, a scale inhibiting composition for inhibiting calcium salt scale formation in alkaline aqueous mixtures of chemical pulping processes is provided, wherein the composition is added to the digester of a chemical pulping process, the composition comprising an effective scale inhibiting amount of at least one phosphonate selected from compounds having the formula:

compounds having the formula:

amine oxides of the phosphonates of formula (I), or mixtures thereof, wherein M is independently selected from hydrogen, alkali metal, alkaline earth metal or ammonium, X is independently selected from H, R, or —CH$_2$PO$_3$M$_2$ wherein R is an alkyl group or —NX$_2$ substituted alkyl group having 2 to 6 carbon atoms, R' is an alkyl group having 1 to 17 carbon atoms and R' is optionally branched and optionally unsaturated, and Y is selected from —PO$_3$M$_2$, H or R'; with the proviso that when the phosphonate is N(CH$_2$PO$_3$M$_2$)$_3$, the amount of the phosphonate on an active acid basis is greater than 25 ppm based on the weight of total liquor charged to the digester.

Further according to the invention, a method for inhibiting calcium salt scale formation in chemical pulping processes is provided comprising admixing an effective scale inhibiting amount of the above composition with the alkaline aqueous mixture in the digester of the chemical pulping process.

Still further according to the invention, a method for inhibiting calcium salt scale formation in an aqueous system in a chemical pulping process having a sufficient quantity of available calcium cations and anions selected from carbonate and sulfate to form said calcium salt scale is provided, comprising admixing an effective scale inhibiting amount of at least one phosphonate with the aqueous system in the digester of the chemical pulping process maintained in a temperature range to inhibit calcium salt scale formation, wherein the at least one phosphonate is as defined above.

Still further according to the invention, a method for inhibiting calcium salt scale formation in an aqueous system in a selected chemical pulping process is provided comprising: (a) determining the calcium salt scale inhibition profiles of phosphonate concentration and process temperature as a function of time for phosphonate compositions admixed with the aqueous digester composition in a chemical pulping process digester, (b) identifying the calcium salt scale inhibition capability required by said selected chemical pulping process based on the process operating conditions of time and temperature, and the aqueous digester composition, (c) selecting the appropriate phosphonate composition and phosphonate use concentration to effectively inhibit calcium salt scale formation in the selected chemical pulping process when the phosphonate is admixed with the aqueous digester composition in the selected chemical pulping process based on steps (a) and (b), and (d) admixing the selected phosphonate composition with the aqueous digester composition in the selected chemical pulping process during the digestion stage of the chemical pulping process; wherein the selected phosphonate composition is as defined above.

Still further according to the invention, a method for inhibiting calcium salt scale formation in an aqueous system in a selected chemical pulping process is provided comprising: (a) identifying the calcium salt scale inhibition capability required by the selected chemical pulping process based on the process operating conditions of time and temperature, and the aqueous digester composition, (b) selecting the appropriate phosphonate composition and phosphonate use concentration to effectively inhibit calcium salt scale formation in the selected chemical pulping process when said phosphonate is admixed with the aqueous digester composition in the selected chemical pulping process based on step (a) and the calcium salt scale inhibition profiles of phosphonate concentration and process temperature as a function of time for phosphonate compositions admixed with the aqueous digester composition in a chemical pulping process digester, and (c) admixing the selected phosphonate composition with the aqueous digester composition in the selected chemical pulping process during the digestion stage of the chemical pulping process; wherein the selected phosphonate composition is as defined above.

DETAILED DESCRIPTION OF THE DRAWINGS

Not Applicable.

DETAILED DESCRIPTION OF THE INVENTION

A first embodiment of the invention relates to a scale inhibiting composition for inhibiting calcium salt scale formation in alkaline aqueous mixtures of chemical pulping processes, wherein the composition is added to the digester of a chemical pulping process, the composition comprising an effective scale inhibiting amount of at least one phosphonate selected from compounds having the formula:

$$X_2NCH_2PO_3M_2 \quad (I),$$

compounds having the formula:

$$\begin{array}{c} R' \\ | \\ Y-C-OH, \\ | \\ PO_3M_2 \end{array} \quad (II)$$

amine oxides of phosphonates of formula (I), or mixtures thereof; wherein M is independently selected from hydrogen, alkali metal, alkaline earth metal or ammonium, X is independently selected from H, R, or —CH$_2$PO$_3$M$_2$ wherein R is an alkyl group or —NX$_2$ substituted alkyl group having 2 to 6 carbon atoms, R' is an alkyl group having 1 to 17 carbon atoms and R' is optionally branched and optionally unsaturated, and Y is selected from —PO$_3$M$_2$, H or R'; with the proviso that when the phosphonate is N(CH$_2$PO$_3$M$_2$)$_3$, the amount of the phosphonate on an active acid basis is greater than 25 ppm based on the weight of total liquor charged to the digester.

In the phosphonates of the invention, M is preferably hydrogen or alkali metal, and the alkali metal is preferably sodium and potassium, X is preferably R or —CH$_2$PO$_3$M$_2$, Y is preferably —PO$_3$M$_2$, and R' is preferably an alkyl group having 1 to 5 carbon atoms.

Examples of suitable phosphonates include, but are not limited to, the phosphonates in Table 1 below. Table 1 below provides formulas for representative phosphonates of formulas (I) and (II). The phosphonates in Table 1 are available from Solutia Inc., 575 Maryville Centre Drive, St. Louis, Mo. under the trademark Dequest® phosphonates and are identified by their Dequest® phosphonate product number.

TABLE 1

| Dequest Product No. | Formula | X (or Y) | R (or R') | n | X' | M |
|---|---|---|---|---|---|---|
| 2000 | I | 2-CH$_2$PO$_3$M$_2$ | — | — | — | 6 H |
| 2006 | I | 2-CH$_2$PO$_3$M$_2$ | — | — | — | 5 Na, 1 H |
| 2010 | II | —PO$_3$M$_2$ | —CH$_3$ | — | — | 4 H |
| 2016 | II | —PO$_3$M$_2$ | —CH$_3$ | — | — | 4 Na |
| 2041 | I | 1 R, 1-CH$_2$PO$_3$M$_2$ | —(CH$_2$)nNX'$_2$ | 2 | 2-CH$_2$PO$_3$M$_2$ | 8 H |
| 2046 | I | 1 R, 1-CH$_2$PO$_3$M$_2$ | —(CH$_2$)nNX'$_2$ | 2 | 2-CH$_2$PO$_3$M$_2$ | 5 Na, 3 H |
| 2054 | I | 1 R, 1-CH$_2$PO$_3$M$_2$ | —(CH$_2$)nNX'$_2$ | 6 | 2-CH$_2$PO$_3$M$_2$ | 6 K, 2 H |
| 2060 | I | 2 R | —(CH$_2$)nNX'$_2$ | 2,2 | 4-CH$_2$PO$_3$M$_2$ | 10 H |
| 2066 | I | 2 R | —(CH$_2$)nNX'$_2$ | 2,2 | 4-CH$_2$PO$_3$M$_2$ | 7 Na, 3 H |

The formulas and corresponding names of the Dequest phosphonates listed in Table 1 are shown below.

Dequest 2000—amino-tris(methylenephosphonic acid)

$N(CH_2PO_3H_2)_3$

Dequest 2006—sodium salt of amino-tris(methylenephosphonic acid)

$Na_5H[N(CH_2PO_3)_3]$

Dequest 2010—1-hydroxyethylidene (1,1-diphosphonic acid)

$CH_3C(OH)(PO_3H_2)_2$

Dequest 2016—sodium salt of 1-hydroxyethylidene (1,1-diphosphonic acid)

$Na_4[CH_3C(OH)(PO_3)_2]$

Dequest 2041—ethylenediamine tetra(methylenephosphonic acid)

$H_8[(O_3PCH_2)_2NCH_2CH_2N(CH_2PO_3)_2]$

Dequest 2046—ethylenediamine tetra(methylenephosphonic acid), pentasodium salt $Na_5H_3[(O_3PCH_2)_2NCH_2CH_2N(CH_2PO_3)_2]$ Dequest 2054—[1,6-hexanediylbis[nitrilobis(methylene)]]tetrakis-phosphonic acid, potassium salt $K_6H_2[(O_3PCH_2)_2N(CH_2)_6N(CH_2PO_3)_2]$ Dequest 2060—diethylenetriamine-penta(methylenephosphonic acid)

$(H_2O_3PCH_2)_2NCH_2CH_2N(CH_2PO_3H_2)CH_2CH_2N(CH_2PO_3H_2)_2$

Dequest 2066—sodium salt of diethylenetriamine-penta(methylenephosphonic acid)

$Na_7H_3[(O_3PCH_2)_2NCH_2CH_2N(CH_2PO_3)CH_2CH_2N(CH_2PO_3)_2]$

Another preferred phosphonate of formula (I) is the compound N,N'-bis(3-aminopropyl)ethylenediamine-hexa(methylenephosphonic acid), or a salt thereof wherein the salt is sodium, potassium, ammonium, and the like. When the compound is the sodium salt, the compound has the formula $Na_xH_y[(O_3PCH_2)_2NCH_2CH_2CH_2N(CH_2PO_3)CH_2CH_2N(CH_2PO_3)CH_2CH_2CH_2N—(CH_2PO_3)_2]$; wherein x+y is 12, and is designated herein as 4NHMP. This compound can be prepared according to the procedure disclosed in Example 1 of U.S. Pat. No. 5,261,491, which is herein incorporated by reference.

One preferred phosphonate of formula (I) is a phosphonate wherein at least one of X is R and R is $(CH_2)_nNX'_2$, wherein n is an integer from 2 to 6, preferably 2 to 4, and X' is independently selected from R or $CH_2PO_3M_2$. Another preferred phosphonate of formula (I) is a phosphonate wherein each X is R and R is $(CH_2)_nNX'_2$, wherein n is an integer from 2 to 6, preferably 2 to 4, and X' is independently selected from R or $CH_2PO_3M_2$.

A more preferred phosphonate of formula (I) is a phosphonate selected from:

$(M_2O_3PCH_2)_2N(CH_2)_3N(CH_2PO_3M_2)(CH_2)_2N(CH_2PO_3M_2)(CH_2)_3N(CH_2PO_3M_2)_2$ or
$(M_2O_3PCH_2)_2NCH_2CH_2N(CH_2PO_3M_2)_2$.

A preferred phosphonate of formula (II) is a phosphonate wherein Y is $PO_3M_2$ and R is alkyl of 1 to 5 carbons. A more preferred phosphonate of formula (II) is a phosphonate wherein Y is $PO_3M_2$ and R is methyl.

A preferred amine oxide of the phosphonate of formula (I) is $^-O \leftarrow ^+N—(CH_2PO_3M_2)_3$.

Blends of at least two phosphonates independently selected from the phosphonates of formulas (I), (II) and (III) may be used according to the invention. It is currently preferred to use a blend of two phosphonates, with a blend of a phosphonate of formula (I) with either a phosphonate of formula (I) or formula (II) being more preferred, and a blend of two phosphonates of formula (I) being most preferred. The composition of the blends can vary over a wide range with the percentage of each component ranging broadly from 1 to 99 wt. %, provided each phosphonate is present in an amount of at least about 1 wt. %. Preferably, each phosphonate is present in an amount of at least about 10 wt. %. In the case of a two component blend, each phosphonate is present preferably in an amount of about 10 to about 90 wt. %, and more preferably in an amount of about 20 to about 80 wt. %.

A series of blends of phosphonates which may be used according to the invention were prepared for testing. The blends were prepared as concentrates having 30% total active acid content and were then diluted to the desired concentration for use. These blends (as described below) were tested as calcium salt scale inhibitors in a simulated Kraft cook according to the procedure described in the Examples. The weight ratios of these various blends are shown in Table 2 below.

TABLE 2

| PRODUCT NO. - BLEND OF PHOSPHONATES | BLEND OF PHOSPHONATES | WEIGHT RATIO OF RESPECTIVE PHOSPHONATES IN BLEND |
|---|---|---|
| Product 78 | D2006/D2066 | 50/50 |
| Product 79 | D2000/D2054 | 50/50 |
| Product 80 | D2006/4NHMP | 50/50 |
| Product 81 | D2010/D2066A | 50/50 |
| Product 82 | D2010/D2054 | 50/50 |
| Product 83A | D2016/4NHMP | 70/30[1] |
| Product 83B | D2016/4NHMP | 25/75[1] |
| Product 84 | D2054/4NHMP | 50/50 |
| Product 85 | D2010/D2000 | 50/50 |
| Product 86 | 4NHMP/D2066A | 50/50 |
| Product 87 | D2054/D2066A | 50/50 |
| Product 94 | D2046/D2006 | 50/50 |
| Product 95 | D2046/D2016 | 60/40 |
| Product 96 | D2046/D2054 | 60/40 |
| Product 97 | D2046/D2066A | 50/50 |
| Product 98 | D2046/4NHMP | 60/40 |

[1] A 50/50 blend concentrate having 30% total active acid content does not remain homogeneous.

The preferred blends for use in the invention are blends of a phosphonate selected from N,N'-bis(3-aminopropyl)ethylenediamine-hexa(methylenephosphonic acid), [1,6-hexanediylbis[nitrilobis(methylene)]]tetrakis-phosphonic acid, ethylenediamine tetra(methylenephosphonic acid), diethylenetriamine-penta(methylenephosphonic acid), or salts thereof with a phosphonate selected from the phosphonates of formulas (I) or (II). More preferred are blends of phosphonates selected from N,N'-bis(3-aminopropyl)ethylenediamine-hexa(methylenephosphonic acid), [1,6-hexanediylbis[nitrilobis(methylene)]]tetrakis-phosphonic acid, ethylenediamine tetra(methylenephosphonic acid), diethylenetriaminepenta(methylenephosphonic acid) or salts thereof with another phosphonate selected from the phosphonates of formulas (I) and blends of N,N'-bis(3-aminopropyl)ethylenediamine-hexa(methylenephosphonic acid) or salts thereof with a phosphonate selected from the phosphonates of formula (II).

An effective amount of phosphonate or mixtures of phosphonates is employed in making and using the scale inhibiting composition of this invention. That effective amount depends on the particular phosphonate(s) employed in practicing this invention and other factors including, but not limited to, the digester composition, the operating conditions (i.e. H-factor) of the digester, the composition and operating conditions in the brown stock washing area and black liquor recovery area, as well as other factors and conditions known to those of ordinary skill in the art. Selection of the effective amount of phosphonate will be readily apparent to one of ordinary skill in the art after reading this specification.

The scale inhibiting composition of the invention include, but are not limited to, at least one phosphonate of formula (I), at least one phosphonate of formula (II), at least one amine oxide of a phosphonate of formula (I), a mixture of at least two phosphonates of formula (I), a mixture of at least one phosphonate of formula (I) or an amine oxide of a phosphonate of formula (I) and at least one phosphonate of formula (II), a mixture of at least one phosphonate of formula (I) and at least one amine oxide of a phosphonate of formula (I), or a mixture of at least two phosphonates of formula (II). Preferably, the scale inhibiting composition of the invention is at least one phosphonate of formula (I), a mixture of at least two phosphonates of formula (I), or a mixture of at least one phosphonate of formula (I) and at least one phosphonate of formula (II).

When the scale inhibiting composition of the invention is at least one phosphonate of formula (I), the phosphonate(s) and the effective scale inhibiting amount of each is as follows.

As used herein, the ppm usage level of scale inhibitor is based on the weight of total liquor charged with the liquor assumed to have a density of 1 g/mL.

When the phosphonate is $N(CH_2PO_3M_2)_3$, the effective scale inhibiting amount of phosphonate on an active acid basis is about 500 to about 1000 ppm, and preferably about 600 to about 800 ppm, based on the weight of total liquor charged to the digester.

When the phosphonate is $(M_2O_3PCH_2)_2NCH_2CH_2N(CH_2PO_3M_2)_2$, the effective amount of the phosphonate on an active acid basis is about 10 to about 1000 ppm, preferably about 20 to about 500 ppm, and more preferably about 30 to about 500 ppm, based on the weight of total liquor charged to the digester.

When the phosphonate is $(M_2O_3PCH_2)_2N(CH_2)_6N(CH_2PO_3M_2)_2$, the effective amount of the phosphonate on an active acid basis is about 150 to about 1000 ppm, preferably about 200 to about 500 ppm, based on the weight of total liquor charged to the digester.

When the phosphonate is $(M_2O_3PCH_2)_2NCH_2CH_2N(CH_2PO_3M_2)CH_2CH_2N(CH_2PO_3M_2)_2$, the effective amount of phosphonate on an active acid basis is about 30 to about 1000 ppm, preferably about 40 to about 500 ppm, based on the weight of total liquor charged to the digester.

When the phosphonate is $(M_2O_3PCH_2)_2NCH_2CH_2CH_2(CH_2PO_3M_2)CH_2CH_2N(CH_2PO_3M_2)CH_2CH_2CH_2N—(CH_2PO_3M_2)_2$, the effective amount of phosphonate on an active acid basis is about 10 to about 1000 ppm, preferably about 20 to about 500 ppm, based on the weight of total liquor charged to the digester.

The preferred phosphonates of formula (I) are $(M_2O_3PCH_2)_2NCH_2CH_2N(CH_2PO_3M_2)_2$, $(M_2O_3PCH_2)_2NCH_2CH_2N(CH_2PO_3M_2)CH_2CH_2N(CH_2PO_3M_2)_2$, or $(M_2O_3PCH_2)_2NCH_2CH_2CH_2N(CH_2PO_3M_2)CH_2CH_2N(CH_2PO_3M_2)CH_2CH_2CH_2N—(CH_2PO_3M_2)_2$, more preferably $(M_2O_3PCH_2)_2NCH_2CH_2N(CH_2PO_3M_2)_2$ or $(M_2O_3PCH_2)_2NCH_2CH_2N(CH_2PO_3M_2)CH_2CH_2N(CH_2PO_3M_2)CH_2CH_2CH_2N—(CH_2PO_3M_2)_2$, and most preferably $(M_2O_3PCH_2)_2NCH_2CH_2N(CH_2PO_3M_2)CH_2CH_2N(CH_2PO_3M_2)CH_2CH_2CH_2N—(CH_2PO_3M_2)_2$.

When the scale inhibiting composition of the invention is at least one phosphonate of formula (II), the phosphonate is preferably $CH_3C(OH)(PO_3M_2)_2$ and the effective scale inhibiting amount of phosphonate on an active acid basis is about 20 to about 200 ppm, preferably about 30 to about 100 ppm, based on the weight of total liquor charged to the digester.

When the scale inhibiting composition of the invention is at least one amine oxide of a phosphonate of formula (I), the effective scale inhibiting amount of amine oxide is the amount on an active acid basis that is equivalent to the effective amount of the corresponding phosphonate of formula (I).

When the scale inhibiting composition of the invention is a mixture of at least two phosphonates of formula (I), the phosphonate(s) and the effective scale inhibiting amount of each is as follows.

When the first phosphonate is $(M_2O_3PCH_2)_2NCH_2CH_2CH_2N(CH_2PO_3M_2)CH_2CH_2N(CH_2PO_3M_2)CH_2CH_2CH_2—N(CH_2PO_3M_2)_2$, the second phosphonate is preferably selected from $N(CH_2PO_3M_2)_3$, $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$. When the second phosphonate is $N(CH_2PO_3M_2)_3$, the amount of the mixture on an active acid basis is about 10 to about 1000 ppm, preferably about 200 to about 500 ppm, based on the weight of total liquor charged to the digester. When the second phosphonate is $(M_2O_3PCH_2)_2NCH_2CH_2N(CH_2PO_3M_2)_2$, the amount of the mixture on an active acid basis is about 20 to about 1000 ppm, preferably about 30 to about 500 ppm, based on the weight of total liquor charged to the digester. When the second phosphonate is $(M_2O_3PCH_2)_2N(CH_2)_6N(CH_2PO_3M_2)_2$, the amount of the mixture on an active acid basis is about 80 to about 1000 ppm, preferably about 300 to about 500 ppm, based on the weight of total liquor charged to the digester. When the second phosphonate is $(M_2O_3PCH_2)_2NCH_2CH_2N(CH_2PO_3M_2)CH_2CH_2N(CH_2PO_3M_2)_2$, the amount of the mixture on an active acid basis is about 10 to about 1000 ppm, preferably about 30 to about 500 ppm, based on the weight of total liquor charged to the digester.

When the first phosphonate is $(M_2O_3PCH_2)_2NCH_2CH_2N(CH_2PO_3M_2)_2$, the second phosphonate is preferably selected from $(M_2O_3PCH_2)_2N(CH_2)_6N(CH_2PO_3M_2)_2$, $(M_2O_3PCH_2)_2NCH_2CH_2N(CH_2PO_3M_2)CH_2CH_2N(CH_2PO_3M_2)_2$, or $N(CH_2PO_3M_2)_3$. When the second phosphonate is $(M_2O_3PCH_2)_2N(CH_2)_6N(CH_2PO_3M_2)_2$ or $N(CH_2PO_3M_2)_3$, the amount of the mixture on an active acid basis is about 30 to about 1000 ppm, preferably about 50 to about 500 ppm, based on the weight of total liquor charged to the digester. When the second phosphonate is $(M_2O_3PCH_2)_2NCH_2CH_2N(CH_2PO_3M_2)CH_2CH_2N(CH_2PO_3M_2)_2$, the amount of the mixture on an active acid basis is about 20 to about 1000 ppm, preferably about 40 to about 500 ppm, based on the weight of total liquor charged to the digester.

When the first phosphonate is $(M_2O_3PCH_2)_2N(CH_2)_6N(CH_2PO_3M_2)_2$, and the second phosphonate is $(M_2O_3PCH_2)_2NCH_2CH_2N(CH_2PO_3M_2)CH_2CH_2N(CH_2PO_3M_2)_2$, the amount of the mixture on an active acid basis is about 50 to about 1000 ppm, preferably about 100 to about 500 ppm, based on the weight of total liquor charged to the digester.

When the first phosphonate is $(M_2O_3PCH_2)_2N(CH_2)_6N(CH_2PO_3M_2)_2$, and the second phosphonate is $N(CH_2PO_3M_2)_3$, the amount of the mixture on an active acid basis is about 100 to about 1000 ppm, preferably about 500 to about 600 ppm, based on the weight of total liquor charged to the digester.

When the first phosphonate is $(M_2O_3PCH_2)_2NCH_2CH_2N(CH_2PO_3M_2)CH_2CH_2N(CH_2PO_3M_2)_2$, and the second phosphonate is $N(CH_2PO_3M_2)_3$, the amount of the mixture on an active acid basis is about 50 to about 1000 ppm, preferably about 150 to about 500 ppm, based on the weight of total liquor charged to the digester.

The preferred blends of at least two phosphonates of formula (I) are blends of $(M_2O_3PCH_2)_2NCH_2CH_2N(CH_2PO_3M_2)CH_2CH_2N(CH_2PO_3M_2)CH_2CH_2CH_2$—$N(CH_2PO_3M_2)_2$ with $N(CH_2PO_3M_2)_3$, $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$, or blends of $(M_2O_3PCH_2)_2NCH_2CH_2N(CH_2PO_3M_2)_2$ with $(M_2O_3PCH_2)_2NCH_2CH_2N(CH_2PO_3M_2)CH_2CH_2N(CH_2PO_3M_2)CH_2CH_2CH_2N$—$(CH_2PO_3M_2)_2$, $(M_2O_3PCH_2)_2N(CH_2)_6N(CH_2PO_3M_2)_2$, $(M_2O_3PCH_2)_2NCH_2CH_2N(CH_2PO_3M_2)CH_2CH_2N(CH_2PO_3M_2)_2$, or $N(CH_2PO_3M_2)_3$.

The most preferred blends of at least two phosphonates of formula (I) are blends of $(M_2O_3PCH_2)_2NCH_2CH_2N(CH_2PO_3M_2)CH_2CH_2N(CH_2PO_3M_2)$—$CH_2CH_2CH_2N(CH_2PO_3M_2)_2$ with $N(CH_2PO_3M_2)_3$, $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$.

When the scale inhibiting composition of the invention is a mixture of at least one phosphonate of formula (I) and at least one phosphonate of formula (II), the phosphonate(s) and the effective scale inhibiting amount of each is as follows.

When the blend is a mixture of a first phosphonate of formula $N(CH_2PO_3M_2)_3$, and the second phosphonate of formula $CH_3C(OH)(PO_3M_2)_2$, the amount of the mixture on an active acid basis is about 30 to about 500 ppm, preferably about 50 to about 300 ppm, based on the weight of total liquor charged to the digester.

Preferred blends are mixtures of a first phosphonate selected from $(M_2O_3PCH_2)_2NCH_2CH_2N(CH_2PO_3M_2)_2$, $(M_2O_3PCH_2)_2NCH_2CH_2N(CH_2PO_3M_2)CH_2CH_2N(CH_2PO_3M_2)_2$, $(M_2O_3PCH_2)_2NCH_2CH_2N(CH_2PO_3M_2)CH_2CH_2N(CH_2PO_3M_2)CH_2CH_2CH_2N$—$(CH_2PO_3M_2)_2$ or $(M_2O_3PCH_2)_2N(CH_2)_6N(CH_2PO_3M_2)_2$, and a second phosphonate selected from $CH_3C(OH)(PO_3M_2)_2$.

When the first phosphonate is $(M_2O_3PCH_2)_2NCH_2CH_2N(CH_2PO_3M_2)_2$, the amount of the mixture on an active acid basis is about 20 to about 1000 ppm, preferably about 30 to about 500 ppm, based on the weight of total liquor charged to the digester. When the first phosphonate is $(M_2O_3PCH_2)_2NCH_2CH_2N(CH_2PO_3M_2)CH_2CH_2N(CH_2PO_3M_2)CH_2CH_2CH_2N$—$(CH_2PO_3M_2)_2$, the amount of the mixture on an active acid basis is about 20 to about 500 ppm, preferably about 20 to about 150 ppm, based on the weight of total liquor charged to the digester. When the first phosphonate is $(M_2O_3PCH_2)_2N(CH_2)_6N(CH_2PO_3M_2)_2$, the amount of the mixture on an active acid basis is about 30 to about 150 ppm, preferably about 40 to about 80 ppm, based on the weight of total liquor charged to the digester. When the first phosphonate is $(M_2O_3PCH_2)_2NCH_2CH_2N(CH_2PO_3M_2)CH_2CH_2N(CH_2PO_3M_2)_2$, the amount of the mixture on an active acid basis is about 30 to about 1000 ppm, preferably about 50 to about 500 ppm, based on the weight of total liquor charged to the digester.

The most preferred blends of at least one phosphonate of formula (I) and at least one phosphonate of formula (II) are blends of $(M_2O_3PCH_2)_2NCH_2CH_2CH_2N(CH_2PO_3M_2)CH_2CH_2N(CH_2PO_3M_2)CH_2CH_2CH_2N$—$(CH_2PO_3M_2)_2$ and $CH_3C(OH)(PO_3M_2)_2$.

A second embodiment of the invention relates to a method for inhibiting calcium salt scale formation in chemical pulping processes comprising adding an effective scale inhibiting amount of at least one phosphonate to the alkaline aqueous mixture in the digester of the chemical pulping process, wherein the at least one phosphonate is selected from compounds having the formula:

$$X_2NCH_2PO_3M_2 \qquad (I),$$

compounds having the formula:

amine oxides of phosphonates of formula (I),
or mixtures thereof;
wherein M, X, R, R' and Y are as defined above; with the proviso that when the phosphonate is $N(CH_2PO_3M_2)_3$, the amount of the phosphonate on an active acid basis is greater than 25 ppm based on the weight of total liquor charged to the digester.

Further according to the second embodiment of the invention, the invention is also a method for inhibiting calcium salt scale formation in an aqueous system in a chemical pulping process having a sufficient quantity of available calcium cations and anions selected from carbonate and sulfate susceptible to form said calcium salt scale, comprising admixing an effective scale inhibiting amount of at least one phosphonate with the aqueous system in the digester of the chemical pulping process maintained in a temperature range of about 110° C. to about 180° C., preferably about 150° C. to about 175° C., to inhibit calcium salt scale formation, wherein the phosphonate is as described above.

In the practice of the method of this invention in a chemical pulping process, e.g. a Kraft process, the aqueous phosphonate composition of the invention is admixed with an alkaline, aqueous composition in the digester. The aqueous phosphonate composition of the invention can be added to the digester using any conventional means known to those of ordinary skill in the art. In addition, the aqueous phosphonate composition of the invention can be added directly to the digester composition or it can be introduced into one of the aqueous feed compositions being charged to the digester prior to charging of that aqueous feed composition. The pH in the digester of an alkaline chemical pulping process is at least 9. In the case of a Kraft process, the pH in the digester is preferably about 10 to about 14, and more preferably about 12 to about 14. The aqueous phosphonate composition of the invention can be added in a batch digester in any conventional manner known to one of ordinary skill in the art. For example, in a batch digester operation, the addition of the aqueous phosphonate composition of the invention can be a bulk addition at the beginning of the digester cook cycle or during the digester cook cycle, or it can be added in multiple charges throughout the digestion cycle or continuously throughout the digester cook cycle. It is currently preferred to add the aqueous phosphonate composition of the invention as a bulk charge at or near the beginning of the digester cook cycle. In the case of a continuous digester operation, the addition of the aqueous phosphonate composition of the invention will typically be added continuously to maintain the effective concentration of phosphonate.

The amount of a scale inhibiting composition of this invention employed is an effective amount which is that amount that is sufficient to provide an effective scale inhibiting concentration of phosphonate in the digester over time at which the formation, deposition and adherence of calcium salt scale, particularly calcium carbonate or calcium sulfate scale, is satisfactorily inhibited in the digester, brown stock washers and/or black liquor recovery area. One of ordinary skill in the art using this invention will know the acceptable level of calcium salt scale in the digester, brown stock washing area, and black liquor recovery area of the particular chemical pulping facility, and will be able to readily select an appropriate phosphonate and concentration for addition to the digester to achieve the desired scale inhibition for the required time based on the disclosure of this specification. It will be apparent to those of skill in the art after reading this specification that many factors of the type which have been mentioned herein and others, will determine the amount of the phosphonate of the invention needed to achieve the desired inhibition. The determination of these amounts is within the ordinary skill of the artisan in this field without undue experimentation considering the direction provided herein.

A third embodiment of the invention relates to a method for inhibiting calcium salt scale formation in an aqueous system in a selected chemical pulping process comprising (a) identifying the calcium salt scale inhibition capability required by the selected chemical pulping process based on the process operating conditions of time, temperature and pressure, and the aqueous digester composition, (b) selecting the appropriate phosphonate composition and phosphonate use concentration to effectively inhibit calcium salt scale formation in the selected chemical pulping process when the phosphonate is admixed with the aqueous digester composition in the selected chemical pulping process based on step (a) and the calcium salt scale inhibition profiles of phosphonate concentration and process temperature as a function of time for phosphonate compositions admixed with the aqueous digester composition in a chemical pulping process digester, and (c) admixing the selected phosphonate composition with the aqueous digester composition in the selected chemical pulping process during the digestion stage of the chemical pulping process; wherein the selected phosphonate composition is as defined above for this invention.

A fourth embodiment of the invention relates to a method for inhibiting calcium salt scale formation in an aqueous system in a selected chemical pulping process comprising (a) determining the calcium salt scale inhibition profiles of phosphonate concentration and process temperature as a function of time for phosphonate compositions admixed with the aqueous digester composition in a chemical pulping process digester, (b) identifying the calcium salt scale inhibition capability required by the selected chemical pulping process based on the process operating conditions of time, temperature and pressure, and the aqueous digester composition, (c) selecting the appropriate phosphonate composition and phosphonate use concentration to effectively inhibit calcium salt scale formation in the selected chemical pulping process when the phosphonate is admixed with the aqueous digester composition in the selected chemical pulping process based on steps (a) and (b), and (d) admixing the selected phosphonate composition with the aqueous digester composition in the selected chemical pulping process during the digestion stage of the chemical pulping process; wherein the selected phosphonate composition is as defined above for this invention.

In the third and fourth embodiments of the invention, the calcium salt scale inhibition profiles of phosphonate concentration and process temperature as a function of time for phosphonate compositions admixed with the aqueous digester composition in a chemical pulping process digester can be determined by conducting laboratory experiments, such as described herein, or by conducting larger scale testing. As each chemical pulping process will vary depending on the type of wood being processed, the specific operating conditions used, the composition in the digester, and the like, the specific phosphonate or phosphonate blend and the required use concentration of same necessary to achieve the desired scale inhibition will be dependent upon the specific chemical pulping process. By utilizing the calcium salt scale inhibition profiles in conjunction with the calcium salt scale inhibition capability required by the selected chemical pulping process based on its process operating conditions of time, temperature and pressure, and the aqueous digester composition, one of ordinary skill in the art may select the appropriate phosphonate composition and phosphonate use concentration to effectively inhibit calcium salt scale formation in the selected chemical pulping process when the phosphonate is admixed with the aqueous digester composition in the selected chemical pulping process.

The invention is further described in the following Examples which are not intended to limit or restrict the invention. Unless otherwise indicated all quantities are expressed in weight.

EXAMPLES

A Kraft cook test was employed in the following examples and illustrates the use of the compositions of this invention in the process of this invention. In carrying out these tests, samples were taken of a composition of the digester at selected times during the cook. The concentration of total calcium and inhibited calcium were determined analytically using Atomic Absorption Spectroscopy (AA). The general procedure described below was followed. Additionally, the tests were generally carried out at inhibitor levels of 10, 50, 100 and 500 parts per million (ppm) active acid based on the amount of total liquor charged to the digester, for each phosphonate composition tested, and also with no inhibitor present.

As used herein, the active acid level is that amount of free acid which is equimolar to the amount of phosphonate that was actually added. Unless otherwise specified, use of "%" is on a weight basis.

Kraft Cook Test

The Kraft Cook Test used herein was developed to gauge the performance of scale inhibition of compositions of this invention in a simulated digester composition wherein calcium is slowly extracted from the wood chips into the Kraft system. The test was a standard Kraft cook with a 5:1 liquor to wood ratio in a MK Systems Inc. minimill laboratory digester. The digester aqueous composition temperature was ramped from ambient temperature to 180° C. in one hour and then maintained at 180° C. for an additional one to two hours. Samples were taken from the digester using a liquid cooled extractor at various time intervals under high pressure and temperature during the cook to monitor calcium concentrations by AA as described in the "Monitoring Calcium Release During Kraft Cook" section below.

Drying of Wood Chips:

Pine wood chips were passed through a 12.5 mm slotted screen, with the small pins being removed.

The chips were sorted by hand to remove any bark or knots, and the wood chips dried at 110° C. for 12 hours. This was done to reduce variability with moisture and extractives. The wood chips were stored in a container with desiccant and allowed to cool to room temperature.

Preparation of White Liquor/Charge of Digester:

A liquor to wood ratio of 5:1 was prepared with 18.5% effective alkali, having a 25% sulfidity and 5 grams per liter of sodium carbonate. The sodium carbonate introduced into the white liquor was representative of that which is typically carried over in the recovery process in a Kraft mill.

The charge of phosphonate employed was based upon the weight of total liquor charged to the digester to give the desired equivalent ppm of active acid in the digester.

White liquor was prepared according to the following procedure. Approximately 2 liters of double-deionized water were transferred to a 4 liter volumetric flask. 322.99 g of 50% sodium hydroxide, 163.76 g $Na_2S \cdot 9H_2O$, and 20.0 g anhydrous sodium carbonate were added to the 4 liter flask and dissolved, enough inhibitor was added to reach the desired concentration, and double deionized water added to fill to the mark.

Prior to running the test, the digester was acid cleaned using a 10% sulfuric acid solution to remove any existing deposits. After the acid cleaning, the digester was rinsed with distilled water.

800 grams of dried Pine wood chips, prepared as described above, were added to the wood chip holder. White liquor (4 L) and wood chips were transferred to the digester and the initial temperature and time recorded.

Monitoring Calcium Release During Kraft Cook:

A 5-mL sample was taken for AA analysis and the heating sequence in the digester was initiated.

(The AA analysis is done by atomic absorption by flame photometry using a Perkin Elmer model 100 spectrometer; see generally, Instrumental Methods of Analysis, Hobart H. Willard, Lynn L. Merritt, Jr.; John A Dean, 4$^{th}$ Edition, D. Van Nostrand Company, Inc. August 1965)

Quantitatively one milliliter (mL) of the sample was transferred to a centrifuge tube with 5 mL of 4% HCl solution and AA was used to determine the calcium content of the sample, i.e. Total Calcium. The remaining sample was drawn into a 10 mL syringe and filtered through a 0.45-µm syringe filter. Quantitatively one mL of the filtrate was transferred to a centrifuge tube with 5 mL of 4% HCl solution and AA was used to determine the calcium content of the filtrate, i.e. Inhibited Calcium.

Every 15 minutes for the length of the test, e.g. approximately 2–4 hours, the liquor in the condenser line was purged, a temperature measurement was made, and a 5 mL liquor sample was pulled. The AA analysis procedure as described above was then repeated. At the end of the test, the calcium content and temperature data were plotted versus time.

Each example below was carried out according to the general procedure recited above. In most examples, the phosphonates were tested at four concentration levels. All levels are given in parts per million phosphonate on an active acid basis by weight total liquor.

Except as specified herein, chemicals used in the examples were obtained from Fisher Scientific. Dequest phosphonates, used individually and in blends in the examples, were obtained from Solutia Inc. (St. Louis, Mo.). 4NHMP was prepared according to the procedure described herein.

Tables 3–96 hereinafter following provide the data for a series of test runs performed on the digester at various levels of phosphonates and mixtures of phosphonates. The phosphonate or blend tested are identified by product name (as defined in Tables 1 and 2 herein) in the header of each Table below. The temperature is in degrees Celsius. Parts per million (ppm) of calcium is in parts per million by weight base on the total liquor.

Example 1

Dequest 2006 was tested in the Kraft Cook Test described in the Examples section at 500, 100, 50 and 10 ppm active acid. The results are given in Tables 4–7 below. In addition, a control experiment with no added inhibitor was run and the results are given below in Table 3. The data in Table 3 can be used as the control for Examples 1–8.

TABLE 3

Kraft Cook with no Inhibitor

| Time, Minutes | Total Calcium, ppm | Inhibited Calcium, ppm | Temperature |
|---|---|---|---|
| 0 | 0 | 0 | 25 |
| 15 | 17.1 | 16.6 | 88 |
| 30 | 37.4 | 36 | 133 |
| 45 | 19.4 | 15 | 168 |
| 60 | 4.6 | 2.5 | 180 |
| 75 | 1.6 | 0.8 | 180 |
| 90 | 0.4 | 0 | 180 |
| 105 | 0 | 0 | 180 |

TABLE 4

500 ppm Dequest 2006

| Time, Minutes | Total Calcium, ppm | Inhibited Calcium, ppm | Temperature |
|---|---|---|---|
| 0 | 0 | 0 | 24 |
| 15 | 20.6 | 20.9 | 82 |
| 30 | 37.8 | 38.2 | 132 |
| 45 | 53 | 53 | 170 |
| 60 | 61.8 | 59.7 | 180 |
| 75 | 68.5 | 66.4 | 180 |
| 90 | 71.2 | 71.9 | 180 |
| 105 | 72.6 | 71.7 | 180 |
| 120 | 70.9 | 64.8 | 180 |
| 150 | 47.4 | 47.5 | 180 |
| 180 | 30.7 | 31.4 | 180 |
| 240 | 32.8 | 22.1 | 180 |

TABLE 5

100 ppm Dequest 2006

| Time, Minutes | Total Calcium, ppm | Inhibited Calcium, ppm | Temperature |
|---|---|---|---|
| 0 | 0 | 0 | 25 |
| 15 | 19.4 | 19.9 | 86 |
| 30 | 36.8 | 36.2 | 130 |
| 45 | 49.4 | 48.5 | 170 |
| 60 | 61.1 | 55.3 | 180 |
| 75 | 60.9 | 58.9 | 180 |
| 90 | 22.8 | 17.4 | 180 |
| 105 | 12.5 | 14. | 180 |
| 120 | 12 | 10.7 | 180 |
| 135 | 9.8 | 9.5 | 180 |
| 150 | 6.8 | 8 | 180 |
| 180 | 6.6 | 7 | 180 |

TABLE 6

50 ppm Dequest 2006

| Time, Minutes | Total Calcium, ppm | Inhibited Calcium, ppm | Temperature |
|---|---|---|---|
| 0 | 0 | 0 | 25 |
| 15 | 15 | 14.9 | 84 |
| 30 | 29.1 | 29 | 132 |
| 45 | 39.2 | 37.6 | 171 |
| 60 | 54.4 | 51 | 180 |
| 75 | 46.2 | 39.1 | 180 |
| 90 | 21.9 | 16.4 | 180 |
| 105 | 15.4 | 13.7 | 180 |
| 120 | 11.8 | 11.1 | 180 |
| 135 | 9.2 | 9.2 | 180 |
| 150 | 8.9 | 7.6 | 180 |
| 180 | 7.6 | 6.8 | 180 |

TABLE 7

10 ppm Dequest 2006

| Time, Minutes | Total Calcium, ppm | Inhibited Calcium, ppm | Temperature |
|---|---|---|---|
| 0 | 0 | 0 | 24 |
| 15 | 10.1 | 10.1 | 88 |
| 30 | 22.7 | 22.1 | 134 |
| 45 | 34.5 | 32.3 | 174 |
| 60 | 25 | 13.1 | 180 |
| 75 | 13.4 | 5.7 | 180 |
| 90 | 8.1 | 5 | 180 |
| 105 | 6.9 | 4.7 | 180 |
| 120 | 6.1 | 4.4 | 180 |

The data of Example 1 demonstrates that a use level of 500 ppm provided significant improvement in calcium inhibition compared to lower use levels or the use of no inhibitor. The data also suggests that a Dequest 2000 and Dequest 2006 use range of about 500 to about 1000 ppm would be effective to inhibit calcium salt scale according to the invention.

Example 2

Dequest 2016 was tested in the Kraft Cook Test described in the Examples section at 500, 100, 50 and 10 ppm active acid. The results are given in Tables 8–11 below.

TABLE 8

500 ppm Dequest 2016

| Time, Minutes | Total Calcium, ppm | Inhibited Calcium, ppm | Temperature |
|---|---|---|---|
| 0 | 0 | 0 | 24 |
| 15 | 13.3 | 13.2 | 90 |
| 30 | 12.2 | 6.4 | 138 |
| 45 | 4.7 | 3.7 | 172 |
| 60 | 4.3 | 4 | 180 |
| 75 | 5.1 | 5 | 180 |
| 90 | 5.5 | 5.2 | 180 |
| 120 | 5.5 | 6.2 | 180 |
| 240 | 6.5 | 7.2 | 180 |

TABLE 9

100 ppm Dequest 2016

| Time, Minutes | Total Calcium, ppm | Inhibited Calcium, ppm | Temperature |
|---|---|---|---|
| 0 | 0 | 0 | 25 |
| 15 | 12.2 | 11.9 | 81 |
| 30 | 22.9 | 22.4 | 131 |
| 45 | 32.2 | 32.7 | 169 |
| 60 | 44 | 43.9 | 180 |
| 75 | 54.1 | 54.7 | 180 |
| 90 | 59 | 57.5 | 180 |
| 105 | 57.9 | 55.4 | 180 |
| 120 | 56.4 | 56.7 | 180 |
| 135 | 52 | 48.9 | 180 |
| 150 | 51.2 | 48.2 | 180 |
| 180 | 25.4 | 21.8 | 180 |

TABLE 10

50 ppm Dequest 2016

| Time, Minutes | Total Calcium, ppm | Inhibited Calcium, ppm | Temperature |
|---|---|---|---|
| 0 | 0 | 0 | 24 |
| 15 | 13.9 | 13.3 | 80 |
| 30 | 28.5 | 27.7 | 131 |
| 45 | 40.9 | 40.7 | 165 |
| 60 | 64.6 | 63.3 | 180 |
| 75 | 80.5 | 80.6 | 180 |
| 90 | 85.7 | 85.9 | 180 |
| 105 | 89.6 | 87.9 | 180 |
| 120 | 88.5 | 87.8 | 180 |
| 150 | 84.5 | 84 | 180 |

TABLE 11

10 ppm Dequest 2016

| Time, Minutes | Total Calcium, ppm | Inhibited Calcium, ppm | Temperature |
|---|---|---|---|
| 0 | 0 | 0 | 24 |
| 15 | 8.7 | 8.1 | 82 |
| 30 | 18.9 | 18.3 | 130 |
| 45 | 33.4 | 32.8 | 162 |
| 60 | 42 | 41.7 | 180 |
| 75 | 39.6 | 38.4 | 180 |
| 90 | 22.5 | 16.8 | 180 |
| 105 | 13 | 8.5 | 180 |
| 120 | 10 | 6.4 | 180 |
| 135 | 7.9 | 5.4 | 180 |

The data of Example 2 demonstrates that use levels of 100 and 50 ppm provided significant improvement in calcium inhibition compared to use levels of 10 and 500 ppm or the use of no inhibitor. The data of this example suggests that a Dequest 2010 and Dequest 2016 use range of about 20 to about 200 ppm would be effective to inhibit calcium salt scale according to the invention.

Example 3

Dequest 2054 was tested in the Kraft Cook Test described in the Examples section at 500, 100, 50 and 10 ppm active acid. The results are given in Tables 12–15 below.

TABLE 12

500 ppm Dequest 2054

| Time, Minutes | Total Calcium, ppm | Inhibited Calcium, ppm | Temperature |
|---|---|---|---|
| 0 | 0 | 0 | 24 |
| 15 | 13.4 | 13.9 | 82 |
| 30 | 27.8 | 27.4 | 120 |
| 45 | 42.8 | 42.5 | 160 |
| 60 | 52.5 | 51 | 180 |
| 75 | 62.9 | 61.3 | 180 |
| 90 | 69.1 | 67.5 | 180 |
| 105 | 69.6 | 69.8 | 180 |
| 120 | 70.5 | 69.2 | 180 |
| 150 | 67.9 | 67.2 | 180 |
| 180 | 65.2 | 64.9 | 180 |
| 240 | 58.7 | 57.4 | 180 |

TABLE 13

100 ppm Dequest 2054

| Time, Minutes | Total Calcium, ppm | Inhibited Calcium, ppm | Temperature |
|---|---|---|---|
| 0 | 0 | 0 | 25 |
| 15 | 9.6 | 9 | 88 |
| 30 | 18.8 | 19.1 | 133 |
| 45 | 32.5 | 32.1 | 168 |
| 60 | 47.6 | 45.8 | 180 |
| 75 | 61.8 | 61.8 | 180 |
| 90 | 66.1 | 57 | 180 |
| 105 | 68.9 | 67.2 | 180 |
| 120 | 64.6 | 64.9 | 180 |
| 135 | 61.2 | 60.6 | 180 |
| 150 | 51.3 | 50.5 | 180 |
| 180 | 27.5 | 26.9 | 180 |

TABLE 14

50 ppm Dequest 2054

| Time, Minutes | Total Calcium, ppm | Inhibited Calcium, ppm | Temperature |
|---|---|---|---|
| 0 | 0 | 0 | 25 |
| 15 | 16.2 | 16.1 | 82 |
| 30 | 30 | 29.3 | 128 |
| 45 | 41.9 | 41.5 | 160 |
| 60 | 61.1 | 57.8 | 184 |
| 75 | 66.2 | 63.4 | 180 |
| 90 | 56.9 | 47 | 180 |
| 105 | 27.1 | 20.6 | 180 |
| 120 | 14.8 | 11.1 | 180 |
| 135 | 10.6 | 9 | 180 |
| 150 | 7.5 | 7.3 | 180 |
| 180 | 5.3 | 5.3 | 180 |

TABLE 15

10 ppm Dequest 2054

| Time, Minutes | Total Calcium, ppm | Inhibited Calcium, ppm | Temperature |
|---|---|---|---|
| 0 | 0.9 | 0.5 | 25 |
| 15 | 12.3 | 12.1 | 82 |
| 30 | 26.5 | 26.5 | 128 |
| 45 | 40.3 | 37.8 | 160 |
| 60 | 38.2 | 34.5 | 184 |
| 75 | 15.3 | 10.9 | 180 |
| 90 | 8.4 | 7.9 | 180 |
| 105 | 6 | 5.6 | 180 |
| 120 | 4.5 | 4.1 | 180 |
| 135 | 3.5 | 3.5 | 180 |
| 150 | 2.7 | 2.5 | 180 |
| 180 | 2.5 | 1.5 | 180 |

The data of Example 3 demonstrates that a use level of 500 ppm provided significant improvement in calcium inhibition compared to 10, 50 and 100 ppm use levels or the use of no inhibitor. The data of this example suggests that a Dequest 2054 use range of about 150 to about 1000 ppm would be effective to inhibit calcium salt scale according to the invention.

Example 4

Dequest 2060S was tested in the Kraft Cook Test described in the Examples section at 100, 50 and 10 ppm active acid. The results are given in Tables 16–18 below.

TABLE 16

100 ppm Dequest 2060S

| Time, Minutes | Total Calcium, ppm | Inhibited Calcium, ppm | Temperature |
|---|---|---|---|
| 0 | 0 | 0 | 25 |
| 15 | 1.2 | 0.6 | 90 |
| 30 | 9.3 | 8.7 | 139 |
| 45 | 25.7 | 26.3 | 174 |
| 60 | 39.7 | 40.3 | 180 |
| 75 | 56.1 | 55.5 | 189 |
| 90 | 65.4 | 63.1 | 186 |
| 105 | 68.9 | 60.2 | 182 |
| 120 | 76 | 74.2 | 180 |
| 150 | 74.2 | 63.1 | 180 |
| 180 | 53.2 | 45.6 | 180 |

TABLE 17

50 ppm Dequest 2060S

| Time, Minutes | Total Calcium, ppm | Inhibited Calcium, ppm | Temperature |
|---|---|---|---|
| 0 | 0 | 0 | 25 |
| 15 | 4.4 | 4 | 82 |
| 30 | 20 | 19 | 134 |
| 45 | 41 | 38.8 | 165 |
| 60 | 61.5 | 60.5 | 180 |
| 75 | 82.7 | 74.7 | 180 |
| 90 | 91.3 | 84.2 | 180 |
| 105 | 88.8 | 85.6 | 180 |
| 120 | 87 | 78.9 | 180 |
| 150 | 71.4 | 67.6 | 180 |
| 180 | 50.6 | 41 | 180 |

TABLE 18

10 ppm Dequest 2060S

| Time, Minutes | Total Calcium, ppm | Inhibited Calcium, ppm | Temperature |
|---|---|---|---|
| 0 | 0 | 0 | 25 |
| 15 | 7.2 | 3.9 | 79 |
| 30 | 21.3 | 19.9 | 134 |
| 45 | 41.2 | 41.2 | 176 |
| 60 | 64 | 60.5 | 180 |
| 75 | 70.9 | 70 | 180 |
| 90 | 61 | 59.2 | 180 |
| 105 | 52 | 51.2 | 180 |
| 120 | 42.6 | 38.4 | 180 |

The data of Example 4 demonstrates that use levels of 50 and 100 ppm provided significant improvement in calcium inhibition compared to a 10 ppm use level or the use of no inhibitor. The data of this example suggests that a Dequest 2060S use range of about 30 to about 1000 ppm would be effective to inhibit calcium salt scale according to the invention.

Example 5

Dequest 2066 was tested in the Kraft Cook Test described in the Examples section at 500, 100, 50 and 10 ppm active acid. The results are given in Tables 19–22 below.

TABLE 19

500 ppm Dequest 2066

| Time, Minutes | Total Calcium, ppm | Inhibited Calcium, ppm | Temperature |
|---|---|---|---|
| 0 | 0 | 0 | 24 |
| 15 | 21.3 | 21.2 | 84 |
| 30 | 36.6 | 36.6 | 134 |
| 45 | 52.5 | 51.4 | 170 |
| 60 | 62.8 | 62.2 | 180 |
| 75 | 70 | 69 | 180 |
| 90 | 72.8 | 72.8 | 180 |
| 105 | 75.2 | 75.3 | 180 |
| 120 | 76.7 | 76.7 | 180 |
| 150 | 76 | 75.3 | 180 |
| 180 | 74.3 | 74.3 | 180 |
| 240 | 69.8 | 68.5 | 180 |

TABLE 20

100 ppm Dequest 2066

| Time, Minutes | Total Calcium, ppm | Inhibited Calcium, ppm | Temperature |
|---|---|---|---|
| 0 | 0 | 0 | 25 |
| 15 | 15.9 | 15.4 | 86 |
| 30 | 30.4 | 29.4 | 130 |
| 45 | 40.8 | 40.8 | 168 |
| 60 | 53.8 | 52.8 | 180 |
| 75 | 60.1 | 59.9 | 180 |
| 90 | 63.4 | 60.3 | 180 |
| 105 | 59.4 | 57.2 | 180 |
| 120 | 63 | 61.7 | 180 |
| 135 | 58.2 | 56.2 | 180 |
| 150 | 55 | 43.4 | 180 |
| 180 | 40.9 | 39.2 | 180 |

TABLE 21

50 ppm Dequest 2066

| Time, Minutes | Total Calcium, ppm | Inhibited Calcium, ppm | Temperature |
|---|---|---|---|
| 0 | 0 | 0 | 24 |
| 15 | 17 | 16.7 | 84 |
| 30 | 33.9 | 32.8 | 130 |
| 45 | 48.8 | 48.2 | 171 |
| 60 | 62.2 | 60.2 | 180 |
| 75 | 73.8 | 65 | 180 |
| 90 | 76.9 | 67.4 | 180 |
| 105 | 75.5 | 65.7 | 180 |
| 120 | 70.8 | 67.2 | 180 |
| 135 | 65.7 | 64 | 180 |
| 150 | 61.1 | 60.1 | 180 |
| 180 | 43.8 | 37.9 | 180 |

TABLE 22

10 ppm Dequest 2066

| Time, Minutes | Total Calcium, ppm | Inhibited Calcium, ppm | Temperature |
|---|---|---|---|
| 0 | 0 | 0 | 24 |
| 15 | 10.2 | 4.6 | 84 |
| 30 | 20.8 | 20.7 | 134 |
| 45 | 32.7 | 31.8 | 170 |
| 60 | 40.5 | 40.3 | 180 |
| 75 | 41.8 | 40 | 180 |
| 90 | 33.8 | 31.8 | 180 |
| 105 | 24.6 | 22.3 | 180 |
| 120 | 16.5 | 13.9 | 180 |
| 150 | 9.5 | 7.4 | 180 |

The data of Example 5 demonstrates that use levels of 50, 100 and 500 ppm provided significant improvement in calcium inhibition compared to a 10 ppm use level or the use of no inhibitor. The data of this example suggests that a Dequest 2066 use range of about 30 to about 1000 ppm would be effective to inhibit calcium salt scale according to the invention.

Example 6

4 NHMP was tested in the Kraft Cook Test described in the Examples section at 500, 100, 50 and 10 ppm active acid. The results are given in Tables 23–26 below.

TABLE 23

500 ppm 4NHMP

| Time, Minutes | Total Calcium, ppm | Inhibited Calcium, ppm | Temperature |
|---|---|---|---|
| 0 | 0 | 0 | 24 |
| 15 | 19.7 | 19.2 | 84 |
| 30 | 37.6 | 37.6 | 132 |
| 45 | 63.3 | 61.9 | 170 |
| 60 | 82.5 | 80.1 | 180 |
| 75 | 89.5 | 89.1 | 180 |
| 90 | 94.4 | 93.2 | 180 |
| 105 | 99.7 | 96.2 | 180 |
| 120 | 101.8 | 99.1 | 180 |
| 150 | 107 | 106.4 | 180 |
| 180 | 102.8 | 101 | 180 |
| 240 | 98.7 | 96.2 | 180 |

TABLE 24

100 ppm 4NHMP

| Time, Minutes | Total Calcium, ppm | Inhibited Calcium, ppm | Temperature |
|---|---|---|---|
| 0 | 0 | 0 | 24 |
| 15 | 13.8 | 13.8 | 84 |
| 30 | 29 | 27.8 | 132 |
| 45 | 54.1 | 53.5 | 170 |
| 60 | 72.2 | 72.6 | 180 |
| 75 | 84.5 | 83.6 | 180 |
| 90 | 96.5 | 93 | 180 |
| 105 | 100.2 | 98.2 | 180 |
| 120 | 100.8 | 97 | 180 |
| 150 | 94.5 | 93.6 | 180 |
| 180 | 86 | 85.3 | 180 |

TABLE 25

50 ppm 4NHMP

| Time, Minutes | Total Calcium, ppm | Inhibited Calcium, ppm | Temperature |
|---|---|---|---|
| 0 | 0 | 0 | 24 |
| 15 | 14.8 | 14.6 | 82 |
| 30 | 30.6 | 30.1 | 130 |
| 45 | 57.7 | 54.1 | 165 |
| 60 | 75 | 72.9 | 180 |
| 75 | 89.8 | 86.5 | 180 |
| 90 | 96.5 | 94.1 | 180 |
| 105 | 101.2 | 99.3 | 180 |
| 120 | 102.8 | 100 | 180 |
| 150 | 97.2 | 97.1 | 180 |
| 180 | 86.1 | 86.5 | 180 |

TABLE 26

10 ppm 4NHMP

| Time, Minutes | Total Calcium, ppm | Inhibited Calcium, ppm | Temperature |
|---|---|---|---|
| 0 | 0 | 0 | 24 |
| 15 | 18 | 12 | 84 |
| 30 | 36 | 30 | 134 |
| 45 | 60 | 54 | 180 |
| 60 | 72 | 72 | 180 |
| 90 | 78 | 78 | 180 |
| 105 | 72 | 72 | 180 |
| 120 | 60 | 60 | 180 |
| 150 | 48 | 48 | 180 |
| 180 | 36 | 36 | 180 |

The data of Example 6 demonstrates that use levels of 10, 50, 100 and 550 ppm provided significant improvement in calcium inhibition compared to the use of no inhibitor. The data of this example suggests that a 4 NHMP use range of about 10 to about 1000 ppm would be effective to inhibit calcium salt scale according to the invention.

Example 7

Dequest 6004 was tested in the Kraft Cook Test described in the Examples section at 500, 100, 50 and 10 ppm active acid. The results are given in Tables 27–30 below.

TABLE 27

500 ppm Dequest 6004

| Time, Minutes | Total Calcium, ppm | Inhibited Calcium, ppm | Temperature |
|---|---|---|---|
| 0 | 0 | 0 | 24 |
| 15 | 26.1 | 25.1 | 82 |
| 30 | 38.6 | 38.6 | 132 |
| 45 | 53.5 | 41 | 169 |
| 60 | 50.6 | 41.2 | 180 |
| 75 | 52.2 | 47.9 | 180 |
| 90 | 53.5 | 50.8 | 180 |
| 105 | 53.8 | 52.9 | 180 |
| 120 | 53.5 | 53.5 | 180 |
| 150 | 54.5 | 49.1 | 180 |
| 180 | 53.1 | 52.1 | 180 |
| 210 | 52.3 | 51.2 | 180 |

TABLE 28

100 ppm Dequest 6004

| Time, Minutes | Total Calcium, ppm | Inhibited Calcium, ppm | Temperature |
|---|---|---|---|
| 0 | 0 | 0 | 24 |
| 15 | 15.6 | 15.6 | 84 |
| 30 | 32.4 | 32 | 132 |
| 45 | 45.1 | 37.5 | 172 |
| 60 | 52.6 | 45.8 | 180 |
| 75 | 59.1 | 51 | 180 |
| 90 | 36.6 | 28.7 | 180 |
| 105 | 25.9 | 22.4 | 180 |
| 120 | 18.8 | 15.6 | 180 |
| 150 | 13.8 | 11.9 | 180 |
| 180 | 10.7 | 9.2 | 180 |

TABLE 29

50 ppm Dequest 6004

| Time, Minutes | Total Calcium, ppm | Inhibited Calcium, ppm | Temperature |
|---|---|---|---|
| 0 | 0 | 0 | 24 |
| 15 | 11.6 | 11.4 | 84 |
| 30 | 27.7 | 27.8 | 132 |
| 45 | 55.5 | 52.3 | 170 |
| 60 | 77.1 | 70.7 | 180 |
| 75 | 70.5 | 58.8 | 180 |
| 90 | 50.7 | 39.9 | 180 |
| 105 | 34.5 | 24.9 | 180 |
| 120 | 28 | 15.6 | 180 |
| 150 | 19.4 | 12.3 | 180 |
| 180 | 17.1 | 8.1 | 180 |

TABLE 30

10 ppm Dequest 6004

| Time, Minutes | Total Calcium, ppm | Inhibited Calcium, ppm | Temperature |
|---|---|---|---|
| 0 | 0 | 0 | 24 |
| 15 | 11 | 10.4 | 84 |
| 30 | 26.1 | 24.9 | 134 |
| 45 | 51.3 | 50.7 | 168 |
| 60 | 32.1 | 20.3 | 180 |
| 75 | 22.8 | 10.1 | 180 |
| 90 | 21.2 | 9.6 | 180 |
| 105 | 18.2 | 8.4 | 180 |
| 120 | 16.5 | 7.8 | 180 |

The data of Example 7 demonstrates that use levels of 50, 100 and 500 ppm provided significant improvement in calcium inhibition compared to the use of 10 ppm inhibitor or the use of no inhibitor. The data of this example suggests that a Dequest 6004 use range of about 50 to about 1000 ppm would be effective to inhibit calcium salt scale according to the invention.

Example 8

Dequest 2046 was tested in the Kraft Cook Test described in the Examples section at 500, 100, 50 and 10 ppm active acid. The results are given in Tables 31–34 below.

TABLE 31

10 ppm Dequest 2046

| Time, minutes | Total Calcium, ppm | Inhibited Calcium, ppm | Temperature |
|---|---|---|---|
| 0 | 0 | 0 | 21 |
| 15 | 18 | 18 | 80 |
| 30 | 30 | 30 | 132 |
| 45 | 48 | 48 | 170 |
| 60 | 60 | 60 | 176 |
| 75 | 66 | 60 | 176 |
| 90 | 54 | 54 | 176 |
| 105 | 42 | 42 | 176 |
| 120 | 36 | 36 | 176 |
| 150 | 30 | 30 | 176 |
| 180 | 30 | 24 | 176 |

TABLE 32

50 ppm Dequest 2046

| Time, minutes | Total Calcium, ppm | Inhibited Calcium, ppm | Temperature |
|---|---|---|---|
| 0 | 0 | 0 | 21 |
| 15 | 12 | 12 | 80 |
| 30 | 36 | 36 | 132 |
| 45 | 48 | 48 | 170 |
| 60 | 60 | 60 | 176 |
| 75 | 72 | 72 | 176 |
| 90 | 72 | 72 | 176 |
| 105 | 78 | 78 | 176 |
| 120 | 78 | 72 | 176 |
| 150 | 60 | 60 | 176 |
| 180 | 54 | 48 | 176 |

TABLE 33

100 ppm Dequest 2046

| Time, minutes | Total Calcium, ppm | Inhibited Calcium, ppm | Temperature |
|---|---|---|---|
| 0 | 0 | 0 | 21 |
| 15 | 18 | 18 | 80 |
| 30 | 30 | 30 | 132 |
| 45 | 48 | 48 | 170 |
| 60 | 60 | 66 | 176 |
| 75 | 72 | 72 | 176 |
| 90 | 72 | 72 | 176 |
| 105 | 78 | 72 | 176 |
| 120 | 78 | 72 | 176 |
| 150 | 72 | 66 | 176 |
| 180 | 60 | 60 | 176 |

TABLE 34

500 ppm Dequest 2046

| Time, minutes | Total Calcium, ppm | Inhibited Calcium, ppm | Temperature |
|---|---|---|---|
| 0 | 0 | 0 | 21 |
| 15 | 30 | 30 | 82 |
| 30 | 42 | 42 | 130 |
| 45 | 60 | 60 | 168 |
| 60 | 78 | 78 | 178 |
| 75 | 90 | 90 | 178 |
| 90 | 102 | 102 | 178 |
| 105 | 108 | 108 | 178 |
| 120 | 114 | 108 | 178 |
| 150 | 120 | 114 | 178 |
| 180 | 120 | 114 | 178 |

The data of Example 8 demonstrates that use levels of 10, 50, 100 and 500 ppm provided significant improvement in calcium inhibition compared to the use of no inhibitor. The data of this example suggests that a Dequest 2046 use range of about 10 to about 1000 ppm would be effective to inhibit calcium salt scale according to the invention.

Phosphonate Blends

A series of blends of phosphonates were made and then tested as calcium carbonate scale inhibitors in a digester according to the procedure described above. The compositions of these various blends are shown in Table 2 above.

Example 9

A control with no inhibitor was tested in the Kraft Cook Test described in the Examples section. The results are given in Table 35 below and can be used as a control for Examples 10–25.

TABLE 35

Kraft Cook with no Inhibitor

| Time, Minutes | Total Calcium, ppm | Inhibited Calcium, ppm | Temperature |
|---|---|---|---|
| 0 | 0 | 0 | 25 |
| 15 | 11.5 | 10.9 | 82 |
| 30 | 24.8 | 23.4 | 128 |
| 45 | 39 | 38.2 | 163 |
| 60 | 16.6 | 14.9 | 180 |
| 75 | 12.9 | 10.3 | 180 |
| 90 | 10.3 | 6.7 | 180 |
| 105 | 9.2 | 7.8 | 180 |
| 120 | 8.4 | 7.8 | 180 |

Example 10

Blend 78 was tested in the Kraft Cook Test described in the Examples section at 500, 100, 50 and 10 ppm active acid. The results are given in Tables 36–39 below.

TABLE 36

500 ppm Blend 78

| Time, Minutes | Total Calcium, ppm | Inhibited Calcium, ppm | Temperature |
|---|---|---|---|
| 0 | 0 | 0 | 22 |
| 15 | 16 | 16 | 80 |

TABLE 36-continued 500 ppm Blend 78

| Time, Minutes | Total Calcium, ppm | Inhibited Calcium, ppm | Temperature |
| --- | --- | --- | --- |
| 30 | 48 | 48 | 124 |
| 45 | 78 | 78 | 164 |
| 60 | 96 | 96 | 176 |
| 75 | 114 | 114 | 176 |
| 90 | 114 | 114 | 176 |
| 105 | 120 | 120 | 176 |
| 120 | 126 | 120 | 176 |
| 150 | 126 | 120 | 176 |
| 180 | 126 | 120 | 176 |

TABLE 37

100 ppm Blend 78

| Time, Minutes | Total Calcium, ppm | Inhibited Calcium, ppm | Temperature |
| --- | --- | --- | --- |
| 0 | 0 | 0 | 25 |
| 15 | 3.3 | 2.6 | 82 |
| 30 | 18.8 | 19.9 | 128 |
| 45 | 29.7 | 28.6 | 163 |
| 60 | 46 | 43.1 | 180 |
| 75 | 57.6 | 53.6 | 180 |
| 90 | 71.3 | 67 | 180 |
| 105 | 73.2 | 67 | 180 |
| 120 | 76.4 | 69.5 | 180 |
| 150 | 56.8 | 53.6 | 180 |
| 180 | 38.8 | 32.6 | 180 |

TABLE 38

50 ppm Blend 78

| Time, Minutes | Total Calcium, ppm | Inhibited Calcium, ppm | Temperature |
| --- | --- | --- | --- |
| 0 | 0 | 0 | 25 |
| 15 | 11.2 | 11.2 | 82 |
| 30 | 27.2 | 28.1 | 128 |
| 45 | 51.4 | 50.4 | 163 |
| 60 | 67.1 | 69.1 | 180 |
| 75 | 85.6 | 82.4 | 180 |
| 90 | 80.8 | 79.2 | 180 |
| 105 | 82.1 | 78.2 | 180 |
| 120 | 72.5 | 67.7 | 180 |
| 150 | 55.9 | 53 | 180 |
| 180 | 35.2 | 33.5 | 180 |

TABLE 39

10 ppm Blend 78

| Time, Minutes | Total Calcium, ppm | Inhibited Calcium, ppm | Temperature |
| --- | --- | --- | --- |
| 0 | 0 | 0 | 25 |
| 15 | 7.8 | 7.4 | 82 |
| 30 | 29.5 | 28.7 | 128 |
| 45 | 60.4 | 57.2 | 163 |
| 60 | 84.4 | 80.4 | 180 |
| 75 | 68.8 | 60.8 | 180 |
| 90 | 41.9 | 32.3 | 180 |
| 105 | 29.5 | 19.5 | 180 |
| 120 | 23.4 | 15.8 | 180 |
| 150 | 18.3 | 12.6 | 180 |
| 180 | 15.1 | 10.3 | 180 |

The data of Example 10 demonstrates that use levels of 50, 100 and 500 ppm provided significant improvement in calcium inhibition compared to the use of 10 ppm inhibitor or the use of no inhibitor. The data of this example suggests that a blend of Dequest 2000 or 2006 and Dequest 2066 or 2060 in the use range of about 50 to about 1000 ppm would be effective to inhibit calcium salt scale according to the invention.

Example 11

Blend 79 was tested in the Kraft Cook Test described in the Examples section at 500, 100, 50 and 10 ppm active acid. The results are given in Tables 40–43 below.

TABLE 40

500 ppm Blend 79

| Time, Minutes | Total Calcium, ppm | Inhibited Calcium, ppm | Temperature |
| --- | --- | --- | --- |
| 0 | 0 | 0 | 22 |
| 15 | 24 | 24 | 80 |
| 30 | 48 | 48 | 124 |
| 45 | 72 | 72 | 166 |
| 60 | 90 | 90 | 180 |
| 75 | 102 | 96 | 180 |
| 90 | 108 | 102 | 180 |
| 105 | 114 | 102 | 180 |
| 120 | 108 | 102 | 180 |
| 150 | 96 | 90 | 180 |
| 180 | 84 | 72 | 180 |

TABLE 41

100 ppm Blend 79

| Time, Minutes | Total Calcium, ppm | Inhibited Calcium, ppm | Temperature |
| --- | --- | --- | --- |
| 0 | 0 | 0 | 25 |
| 15 | 7 | 5.4 | 82 |
| 30 | 20.3 | 19.6 | 128 |
| 45 | 42.6 | 41.9 | 163 |
| 60 | 62.2 | 57.2 | 180 |
| 75 | 78.1 | 69.8 | 180 |
| 90 | 89.7 | 82.1 | 180 |
| 105 | 93.7 | 78.8 | 180 |
| 120 | 93.1 | 81.5 | 180 |
| 150 | 68.5 | 45.9 | 180 |
| 180 | 44.4 | 31.3 | 180 |

TABLE 42

50 ppm Blend 79

| Time, Minutes | Total Calcium, ppm | Inhibited Calcium, ppm | Temperature |
| --- | --- | --- | --- |
| 0 | 0 | 0 | 25 |
| 15 | 9.3 | 9.1 | 82 |
| 30 | 22.9 | 22.6 | 128 |
| 45 | 52.4 | 49.5 | 163 |
| 60 | 74.7 | 69.6 | 180 |
| 75 | 85.1 | 78.3 | 180 |
| 90 | 86.4 | 79.3 | 180 |
| 105 | 74.1 | 62.4 | 180 |
| 120 | 57.6 | 42.4 | 180 |
| 150 | 33.9 | 22.9 | 180 |
| 180 | 25.6 | 17.4 | 180 |

TABLE 43

10 ppm Blend 79

| Time, Minutes | Total Calcium, ppm | Inhibited Calcium, ppm | Temperature |
|---|---|---|---|
| 0 | 0 | 0 | 25 |
| 15 | 11.2 | 11.2 | 82 |
| 30 | 24.4 | 23.7 | 128 |
| 45 | 51.2 | 45.1 | 163 |
| 60 | 61.2 | 55.1 | 180 |
| 75 | 40.2 | 15. | 180 |
| 90 | 24.1 | 9.5 | 180 |
| 105 | 16.3 | 6.3 | 180 |
| 120 | 10.5 | 6.3 | 180 |
| 150 | 6.6 | 3.7 | 180 |
| 180 | 2.7 | 2.1 | 180 |

The data of Example 11 demonstrates that use levels of 50, 100 and 500 ppm provided significant improvement in calcium inhibition compared to the use of 10 ppm inhibitor or the use of no inhibitor. The data of this example suggests that a blend of Dequest 2000 or 2006 and Dequest 2054 in the use range of about 50 to about 1000 ppm would be effective to inhibit calcium salt scale according to the invention.

Example 12

Blend 80 was tested in the Kraft Cook Test described in the Examples section at 500, 100, 50 and 10 ppm active acid. The results are given in Tables 44–47 below.

TABLE 44

500 ppm Blend 80

| Time, Minutes | Total Calcium, ppm | Inhibited Calcium, ppm | Temperature |
|---|---|---|---|
| 0 | 0 | 0 | 22 |
| 15 | 24 | 24 | 80 |
| 30 | 42 | 42 | 124 |
| 45 | 72 | 72 | 164 |
| 60 | 90 | 90 | 179 |
| 75 | 102 | 102 | 180 |
| 90 | 108 | 108 | 180 |
| 105 | 114 | 108 | 180 |
| 120 | 114 | 102 | 180 |
| 150 | 114 | 96 | 180 |
| 180 | 108 | 90 | 180 |

TABLE 45

100 ppm Blend 80

| Time, Minutes | Total Calcium, ppm | Inhibited Calcium, ppm | Temperature |
|---|---|---|---|
| 0 | 0 | 0 | 25 |
| 15 | 12.9 | 11.7 | 86 |
| 30 | 31.2 | 29.3 | 132 |
| 45 | 61 | 58.7 | 168 |
| 60 | 89.2 | 83.8 | 179 |
| 75 | 104.8 | 103.7 | 180 |
| 90 | 113.6 | 109.8 | 180 |
| 105 | 112.8 | 101.7 | 180 |
| 120 | 103.7 | 96.1 | 180 |
| 150 | 76.2 | 71.3 | 180 |
| 180 | 50.7 | 47.6 | 180 |

TABLE 46

50 ppm Blend 80

| Time, Minutes | Total Calcium, ppm | Inhibited Calcium, ppm | Temperature |
|---|---|---|---|
| 0 | 0 | 0 | 25 |
| 15 | 7.7 | 7.4 | 86 |
| 30 | 19.4 | 19.1 | 132 |
| 45 | 41.7 | 41.1 | 168 |
| 60 | 60.8 | 59.2 | 179 |
| 75 | 75.4 | 74.1 | 180 |
| 90 | 85.4 | 83.1 | 180 |
| 105 | 84.8 | 78.3 | 180 |
| 120 | 78 | 70.8 | 180 |
| 150 | 63.1 | 55.6 | 180 |
| 180 | 39.2 | 33 | 180 |

TABLE 47

10 ppm Blend 80

| Time, Minutes | Total Calcium, ppm | Inhibited Calcium, ppm | Temperature |
|---|---|---|---|
| 0 | 0 | 0 | 25 |
| 15 | 10.3 | 10.3 | 86 |
| 30 | 19.5 | 19.2 | 132 |
| 45 | 31.2 | 30.9 | 168 |
| 60 | 39.2 | 35 | 179 |
| 75 | 36.7 | 33.9 | 180 |
| 90 | 32.3 | 31.5 | 180 |
| 105 | 28.2 | 26.7 | 180 |
| 120 | 21.3 | 19.9 | 180 |
| 150 | 12.3 | 11.3 | 180 |
| 180 | 5.5 | 4.4 | 180 |

The data of Example 12 demonstrates that use levels of 10, 50, 100 and 500 ppm provided significant improvement in calcium inhibition compared to the use of no inhibitor. The data of this example suggests that a blend of Dequest 2000 or 2006 and 4 NHMP in the use range of about 10 to about 1000 ppm would be effective to inhibit calcium salt scale according to the invention.

Example 13

Blend 81B was tested in the Kraft Cook Test described in the Examples section at 500, 100, 50 and 10 ppm active acid. The results are given in Tables 48–51 below.

TABLE 48

500 ppm Blend 81B

| Time, Minutes | Total Calcium, ppm | Inhibited Calcium, ppm | Temperature |
|---|---|---|---|
| 0 | 0 | 0 | 22 |
| 15 | 24 | 24 | 80 |
| 30 | 42 | 42 | 124 |
| 45 | 42 | 42 | 164 |
| 60 | 42 | 42 | 180 |
| 75 | 42 | 42 | 180 |
| 90 | 42 | 42 | 180 |
| 105 | 48 | 48 | 180 |
| 120 | 48 | 48 | 180 |
| 150 | 48 | 48 | 180 |
| 180 | 54 | 54 | 180 |

TABLE 49

100 ppm Blend 81B

| Time, Minutes | Total Calcium, ppm | Inhibited Calcium, ppm | Temperature |
|---|---|---|---|
| 0 | 0 | 0 | 25 |
| 15 | 7 | 7.1 | 82 |
| 30 | 18.8 | 18.5 | 128 |
| 45 | 38.5 | 36.5 | 163 |
| 60 | 65.6 | 61.8 | 180 |
| 75 | 85.7 | 83.3 | 180 |
| 90 | 102.3 | 91.6 | 180 |
| 105 | 106.5 | 103.4 | 180 |
| 120 | 113.1 | 108.6 | 180 |
| 150 | 107.9 | 104.1 | 180 |
| 180 | 97.1 | 94.4 | 180 |

TABLE 50

50 ppm Blend 81B

| Time, Minutes | Total Calcium, ppm | Inhibited Calcium, ppm | Temperature |
|---|---|---|---|
| 0 | 0 | 0 | 25 |
| 15 | 6.2 | 5.8 | 82 |
| 30 | 15.5 | 15.2 | 128 |
| 45 | 34.3 | 33.6 | 163 |
| 60 | 56 | 45.3 | 180 |
| 75 | 71.2 | 67.6 | 180 |
| 90 | 83.5 | 79.3 | 180 |
| 105 | 84.2 | 81.5 | 180 |
| 120 | 79.3 | 76.7 | 180 |
| 150 | 69.6 | 67.9 | 180 |
| 180 | 58.9 | 55.3 | 180 |

TABLE 51

10 ppm Blend 81B

| Time, Minutes | Total Calcium, ppm | Inhibited Calcium, ppm | Temperature |
|---|---|---|---|
| 0 | 0 | 0 | 25 |
| 15 | 11.3 | 10.9 | 82 |
| 30 | 23.4 | 22.4 | 128 |
| 45 | 45.4 | 43.7 | 163 |
| 60 | 54.6 | 53.3 | 180 |
| 75 | 54.9 | 51.9 | 180 |
| 90 | 49.3 | 46.4 | 180 |
| 105 | 38.8 | 37.8 | 180 |
| 120 | 30.6 | 29.6 | 180 |
| 150 | 12.6 | 11.6 | 180 |
| 180 | 4.4 | 3.7 | 180 |

The data of Example 13 demonstrates that use levels of 50, 100 and 500 ppm provided significant improvement in calcium inhibition compared to the use of 10 ppm inhibitor the use of no inhibitor. The data of this example suggests that a blend of Dequest 2010 or 2016 and Dequest 2066 or 2060 in the use range of about 30 to about 1000 ppm would be effective to inhibit calcium salt scale according to the invention.

Example 14

Blend 82 was tested in the Kraft Cook Test described in the Examples section at 500, 100, 50 and 10 ppm active acid. The results are given in Tables 52–55 below.

TABLE 52

500 ppm Blend 82

| Time, Minutes | Total Calcium, ppm | Inhibited Calcium, ppm | Temperature |
|---|---|---|---|
| 0 | 0 | 0 | 22 |
| 15 | 24 | 24 | 82 |
| 30 | 30 | 30 | 126 |
| 45 | 18 | 12 | 162 |
| 60 | 18 | 12 | 180 |
| 75 | 18 | 18 | 180 |
| 90 | 24 | 18 | 180 |
| 105 | 24 | 24 | 180 |
| 120 | 24 | 24 | 180 |
| 150 | 24 | 24 | 180 |
| 180 | 24 | 24 | 180 |

TABLE 53

100 ppm Blend 82

| Time, Minutes | Total Calcium, ppm | Inhibited Calcium, ppm | Temperature |
|---|---|---|---|
| 0 | 0 | 0 | 25 |
| 15 | 7.3 | 4.9 | 82 |
| 30 | 21 | 18 | 128 |
| 45 | 40.7 | 38.5 | 163 |
| 60 | 59.8 | 58.8 | 180 |
| 75 | 78.8 | 76.2 | 180 |
| 90 | 98.3 | 97.3 | 180 |
| 105 | 109.3 | 107.9 | 180 |
| 120 | 108.6 | 106.6 | 180 |
| 150 | 94.6 | 88.2 | 180 |
| 180 | 76.5 | 72.5 | 180 |

TABLE 54

50 ppm Blend 82

| Time, Minutes | Total Calcium, ppm | Inhibited Calcium, ppm | Temperature |
|---|---|---|---|
| 0 | 0 | 0 | 25 |
| 15 | 9.2 | 8.9 | 82 |
| 30 | 21.7 | 21.4 | 128 |
| 45 | 46.7 | 44.9 | 163 |
| 60 | 62.4 | 61.8 | 180 |
| 75 | 77.4 | 75.2 | 180 |
| 90 | 92.4 | 89.3 | 180 |
| 105 | 99.6 | 97.1 | 180 |
| 120 | 94.9 | 95.9 | 180 |
| 150 | 90.5 | 87.4 | 180 |
| 180 | 82.4 | 79 | 180 |

TABLE 55

10 ppm Blend 82

| Time, Minutes | Total Calcium, ppm | Inhibited Calcium, ppm | Temperature |
|---|---|---|---|
| 0 | 0 | 0 | 25 |
| 15 | 12 | 12 | 82 |
| 30 | 30 | 30 | 128 |
| 45 | 42 | 42 | 163 |
| 60 | 54 | 54 | 180 |
| 75 | 42 | 30 | 180 |
| 90 | 30 | 24 | 180 |
| 105 | 24 | 18 | 180 |
| 120 | 18 | 18 | 180 |
| 150 | 18 | 18 | 180 |
| 180 | 18 | 12 | 180 |

The data of Example 14 demonstrates that use levels of 50 and 100 ppm provided significant improvement in calcium inhibition compared to the use of 10 or 500 ppm inhibitor or the use of no inhibitor. The data of this example suggests that a blend of Dequest 2010 or 2016 and Dequest 2054 in the use range of about 30 to about 150 ppm would be effective to inhibit calcium salt scale according to the invention.

Example 15

Blend 83A was tested in the Kraft Cook Test described in the Examples section at 500, 100, 50 and 10 ppm active acid. The results are given in Tables 56–59 below.

TABLE 56

500 ppm Blend 83A

| Time, Minutes | Total Calcium, ppm | Inhibited Calcium, ppm | Temperature |
|---|---|---|---|
| 0 | 0 | 0 | 22 |
| 15 | 24 | 24 | 82 |
| 30 | 24 | 24 | 124 |
| 45 | 18 | 18 | 156 |
| 60 | 18 | 18 | 176 |
| 75 | 18 | 18 | 176 |
| 90 | 18 | 18 | 176 |
| 105 | 18 | 18 | 176 |
| 120 | 18 | 18 | 176 |
| 150 | 24 | 24 | 176 |
| 180 | 24 | 24 | 176 |

TABLE 57

100 ppm Blend 83A

| Time, Minutes | Total Calcium, ppm | Inhibited Calcium, ppm | Temperature |
|---|---|---|---|
| 0 | 0 | 0 | 25 |
| 15 | 5 | 4.7 | 82 |
| 30 | 19 | 18 | 128 |
| 45 | 33.1 | 32.7 | 163 |
| 60 | 54.9 | 52.8 | 180 |
| 75 | 75.7 | 72 | 180 |
| 90 | 91.8 | 90.4 | 180 |
| 105 | 98.9 | 98.3 | 180 |
| 120 | 99.3 | 96.9 | 180 |
| 150 | 93.5 | 88.7 | 180 |
| 180 | 89.7 | 84.9 | 180 |

TABLE 58

50 ppm Blend 83A

| Time, Minutes | Total Calcium, ppm | Inhibited Calcium, ppm | Temperature |
|---|---|---|---|
| 0 | 0 | 0 | 25 |
| 15 | 6.7 | 6.4 | 82 |
| 30 | 17.4 | 17.1 | 128 |
| 45 | 38.8 | 36.5 | 163 |
| 60 | 59.2 | 59.9 | 180 |
| 75 | 76.4 | 75.1 | 180 |
| 90 | 89.4 | 88.7 | 180 |
| 105 | 96.1 | 93.5 | 180 |
| 120 | 98.4 | 97.1 | 180 |
| 150 | 98.7 | 96.4 | 180 |
| 180 | 94.8 | 92.5 | 180 |

TABLE 59

10 ppm Blend 83A

| Time, Minutes | Total Calcium, ppm | Inhibited Calcium, ppm | Temperature |
|---|---|---|---|
| 0 | 0 | 0 | 25 |
| 15 | 10.7 | 10.4 | 82 |
| 30 | 22.7 | 22.1 | 128 |
| 45 | 43.6 | 42.6 | 163 |
| 60 | 59.4 | 58.3 | 180 |
| 75 | 67.9 | 63.5 | 180 |
| 90 | 64.4 | 63.4 | 180 |
| 105 | 56.3 | 52.8 | 180 |
| 120 | 45 | 42.3 | 180 |
| 150 | 25.8 | 24.8 | 180 |
| 180 | 14.9 | 13.5 | 180 |

The data of Example 15 demonstrates that use levels of 50, 100 and 500 ppm provided significant improvement in calcium inhibition compared to the use of 10 ppm inhibitor or the use of no inhibitor. The data of this example suggests that a blend of Dequest 2010 or 2016 and 4 NHMP in the use range of about 20 to about 550 ppm would be effective to inhibit calcium salt scale according to the invention.

Example 16

Blend 83B was tested in the Kraft Cook Test described in the Examples section at 500, 100, 50 and 10 ppm active acid. The results are given in Tables 60–63 below.

TABLE 60

500 ppm Blend 83B

| Time, Minutes | Total Calcium, ppm | Inhibited Calcium, ppm | Temperature |
|---|---|---|---|
| 0 | 0 | 0 | 22 |
| 15 | 18 | 18 | 80 |
| 30 | 36 | 36 | 124 |
| 45 | 36 | 36 | 166 |
| 60 | 36 | 36 | 180 |
| 75 | 36 | 36 | 180 |
| 90 | 42 | 42 | 180 |
| 105 | 42 | 42 | 180 |
| 120 | 42 | 42 | 180 |
| 158 | 42 | 42 | 180 |
| 180 | 42 | 42 | 180 |

TABLE 61

100 ppm Blend 83B

| Time, Minutes | Total Calcium, ppm | Inhibited Calcium, ppm | Temperature |
|---|---|---|---|
| 0 | 0 | 0 | 25 |
| 15 | 12 | 12 | 82 |
| 30 | 30 | 30 | 128 |
| 45 | 54 | 54 | 163 |
| 60 | 72 | 72 | 180 |
| 75 | 84 | 84 | 180 |
| 90 | 108 | 101 | 180 |
| 105 | 108 | 101 | 180 |
| 120 | 108 | 101 | 180 |
| 150 | 108 | 108 | 180 |
| 180 | 114 | 108 | 180 |

TABLE 62

50 ppm Blend 83B

| Time, Minutes | Total Calcium, ppm | Inhibited Calcium, ppm | Temperature |
|---|---|---|---|
| 0 | 0 | 0 | 25 |
| 15 | 12.4 | 11.9 | 82 |
| 30 | 28.4 | 28.3 | 128 |
| 45 | 56.1 | 54.7 | 163 |
| 60 | 86.7 | 83.8 | 180 |
| 75 | 110.2 | 107.8 | 180 |
| 90 | 124.8 | 123.4 | 180 |
| 105 | 133.2 | 129.9 | 180 |
| 120 | 135.2 | 128.5 | 180 |
| 158 | 134.6 | 132.3 | 180 |
| 180 | 115.8 | 104.5 | 180 |

TABLE 63

10 ppm Blend 83B

| Time, Minutes | Total Calcium, ppm | Inhibited Calcium, ppm | Temperature |
|---|---|---|---|
| 0 | 0 | 0 | 25 |
| 15 | 18 | 12 | 82 |
| 30 | 30 | 30 | 128 |
| 45 | 42 | 42 | 163 |
| 60 | 54 | 54 | 180 |
| 75 | 60 | 54 | 180 |
| 90 | 60 | 60 | 180 |
| 105 | 60 | 54 | 180 |
| 120 | 60 | 60 | 180 |
| 158 | 54 | 54 | 180 |
| 180 | 42 | 42 | 180 |

The data of Example 16 demonstrates that use levels of 50, 100 and 500 ppm provided significant improvement in calcium inhibition compared to the use of 10 ppm inhibitor the use of no inhibitor. The data of this example suggests that a blend of Dequest 2010 or 2016 and 4 NHMP in the use range of about 20 to about 500 ppm would be effective to inhibit calcium salt scale according to the invention.

Example 17

Blend 84 was tested in the Kraft Cook Test described in the Examples section at 500, 100, 50 and 10 ppm active acid. The results are given in Tables 64–67 below.

TABLE 64

500 ppm Blend 84

| Time, Minutes | Total Calcium, ppm | Inhibited Calcium, ppm | Temperature |
|---|---|---|---|
| 0 | 0 | 0 | 22 |
| 15 | 24 | 24 | 82 |
| 30 | 48 | 48 | 126 |
| 45 | 78 | 78 | 164 |
| 60 | 102 | 102 | 180 |
| 75 | 120 | 114 | 180 |
| 90 | 126 | 120 | 180 |
| 105 | 132 | 126 | 180 |
| 120 | 132 | 126 | 180 |
| 150 | 120 | 114 | 180 |
| 180 | 102 | 102 | 180 |

TABLE 65

100 ppm Blend 84

| Time, Minutes | Total Calcium, ppm | Inhibited Calcium, ppm | Temperature |
|---|---|---|---|
| 0 | 0 | 0 | 25 |
| 15 | 6.3 | 5.9 | 82 |
| 30 | 19.6 | 17.3 | 128 |
| 45 | 42.7 | 41.7 | 163 |
| 60 | 53.7 | 51.7 | 180 |
| 75 | 81.5 | 79.5 | 180 |
| 90 | 94.3 | 93.2 | 180 |
| 105 | 106.6 | 104.3 | 180 |
| 120 | 110.3 | 107.9 | 180 |
| 150 | 99.3 | 96.9 | 180 |
| 180 | 59.1 | 58.8 | 180 |

TABLE 66

50 ppm Blend 84

| Time, Minutes | Total Calcium, ppm | Inhibited Calcium, ppm | Temperature |
|---|---|---|---|
| 0 | 0 | 0 | 25 |
| 15 | 6.7 | 6.4 | 82 |
| 30 | 17.8 | 17.4 | 128 |
| 45 | 42.7 | 40.4 | 163 |
| 60 | 57.3 | 56.6 | 180 |
| 75 | 73.8 | 72.8 | 180 |
| 90 | 84.8 | 83.8 | 180 |
| 105 | 89.6 | 89 | 180 |
| 120 | 91.2 | 86.4 | 180 |
| 150 | 65.7 | 62.4 | 180 |
| 180 | 38.8 | 38.5 | 180 |

TABLE 67

10 ppm Blend 84

| Time, Minutes | Total Calcium, ppm | Inhibited Calcium, ppm | Temperature |
|---|---|---|---|
| 0 | 0 | 0 | 25 |
| 15 | 8.3 | 7.9 | 82 |
| 30 | 15.8 | 15.5 | 128 |
| 45 | 36.5 | 35.5 | 163 |
| 60 | 52.3 | 50.9 | 180 |
| 75 | 58.8 | 55.7 | 180 |
| 90 | 55.3 | 52.9 | 180 |
| 105 | 43.4 | 42.3 | 180 |
| 120 | 34.4 | 33.1 | 180 |
| 150 | 22.1 | 20.3 | 180 |
| 180 | 12.7 | 11.4 | 180 |

The data of Example 17 demonstrates that use levels of 100 and 500 ppm significant improvement in calcium inhibition compared to the use of 10 or 50 ppm inhibitor or the use of no inhibitor. The data of this example suggests that a blend of 4 NHMP and Dequest 2054 in the use range of about 80 to about 1000 ppm would be effective to inhibit calcium salt scale according to the invention.

Example 18

Blend 85 was tested in the Kraft Cook Test described in the Examples section at 100 ppm active acid. The results are given in Table 68 below.

TABLE 68

100 ppm Blend 85

| Time, Minutes | Total Calcium, ppm | Inhibited Calcium, ppm | Temperature |
|---|---|---|---|
| 0 | 0 | 0 | 25 |
| 15 | 10.5 | 10.2 | 82 |
| 30 | 24.3 | 23.7 | 128 |
| 45 | 41.1 | 40.3 | 163 |
| 60 | 58.5 | 57.9 | 180 |
| 75 | 73.9 | 73.6 | 180 |
| 90 | 86.8 | 86 | 180 |
| 105 | 89.1 | 89.1 | 180 |
| 120 | 94.4 | 94.4 | 180 |
| 150 | 97.5 | 94.9 | 180 |
| 180 | 90.5 | 89.3 | 180 |

The data of Example 18 demonstrates that a use level of 100 ppm provided significant improvement in calcium inhibition compared to the use of no inhibitor. The data of this example suggests that a blend of Dequest 2000 or 2006 and Dequest 2010 or 2016 in the use range of about 70 to about 200 ppm would be effective to inhibit calcium salt scale according to the invention.

Example 19

Blend 86 was tested in the Kraft Cook Test described in the Examples section at 500, 100, 50 and 10 ppm active acid. The results are given in Tables 69–72 below.

TABLE 69

500 ppm Blend 86

| Time, Minutes | Total Calcium, ppm | Inhibited Calcium, ppm | Temperature |
|---|---|---|---|
| 0 | 0 | 0 | 22 |
| 15 | 24 | 24 | 84 |
| 30 | 36 | 36 | 126 |
| 45 | 66 | 66 | 166 |
| 60 | 84 | 84 | 180 |
| 75 | 96 | 90 | 180 |
| 90 | 108 | 102 | 180 |
| 105 | 114 | 108 | 180 |
| 120 | 114 | 108 | 180 |
| 150 | 114 | 108 | 180 |
| 180 | 108 | 102 | 180 |

TABLE 70

100 ppm Blend 86

| Time, Minutes | Total Calcium, ppm | Inhibited Calcium, ppm | Temperature |
|---|---|---|---|
| 0 | 0 | 0 | 25 |
| 15 | 4.4 | 4.1 | 82 |
| 30 | 16.4 | 15.9 | 128 |
| 45 | 34.9 | 29.9 | 163 |
| 60 | 44.7 | 43.9 | 180 |
| 75 | 57.1 | 56.8 | 180 |
| 90 | 69.2 | 68.3 | 180 |
| 105 | 73.1 | 72.3 | 180 |
| 120 | 73.6 | 70 | 180 |
| 150 | 66.4 | 63.5 | 180 |
| 180 | 52.1 | 46.7 | 180 |

TABLE 71

50 ppm Blend 86

| Time, Minutes | Total Calcium, ppm | Inhibited Calcium, ppm | Temperature |
|---|---|---|---|
| 0 | 0 | 0 | 25 |
| 15 | 6.1 | 5.8 | 82 |
| 30 | 19.1 | 18.7 | 128 |
| 45 | 45.3 | 44.6 | 163 |
| 60 | 64.1 | 63.4 | 180 |
| 75 | 75.7 | 74.4 | 180 |
| 90 | 88 | 81.6 | 180 |
| 105 | 89.9 | 88.3 | 180 |
| 120 | 87.1 | 84.8 | 180 |
| 150 | 57.3 | 54.3 | 180 |
| 180 | 33.9 | 33.6 | 180 |

TABLE 72

10 ppm Blend 86

| Time, Minutes | Total Calcium, ppm | Inhibited Calcium, ppm | Temperature |
|---|---|---|---|
| 0 | 0 | 0 | 25 |
| 15 | 12 | 12 | 82 |
| 30 | 30 | 30 | 128 |
| 45 | 42 | 42 | 163 |
| 60 | 54 | 48 | 180 |
| 75 | 54 | 54 | 180 |
| 90 | 54 | 54 | 180 |
| 105 | 48 | 48 | 180 |
| 120 | 42 | 42 | 180 |
| 150 | 30 | 30 | 180 |
| 180 | 24 | 24 | 180 |

The data of Example 19 demonstrates that use levels of 10, 50, 100 and 500 ppm provided significant improvement in calcium inhibition compared to the use of no inhibitor. The data of this example suggests that a blend of Dequest 2060 or 2066 and 4 NHMP in the use range of about 10 to about 1000 ppm would be effective to inhibit calcium salt scale according to the invention.

Example 20

Blend 87 was tested in the Kraft Cook Test described in the Examples section at 500, 100, 50 and 10 ppm active acid. The results are given in Tables 73–76 below.

TABLE 73

500 ppm Blend 87

| Time, Minutes | Total Calcium, ppm | Inhibited Calcium, ppm | Temperature |
|---|---|---|---|
| 0 | 0 | 0 | 22 |
| 15 | 30 | 30 | 82 |
| 30 | 48 | 48 | 126 |
| 45 | 78 | 78 | 163 |
| 60 | 96 | 96 | 180 |
| 75 | 114 | 108 | 180 |
| 90 | 120 | 114 | 180 |
| 105 | 126 | 120 | 180 |
| 120 | 132 | 126 | 180 |
| 158 | 138 | 132 | 180 |
| 180 | 138 | 132 | 180 |

TABLE 74

100 ppm Blend 87

| Time, Minutes | Total Calcium, ppm | Inhibited Calcium, ppm | Temperature |
|---|---|---|---|
| 0 | 0 | 0 | 25 |
| 15 | 7.4 | 7.1 | 82 |
| 30 | 21.3 | 20.9 | 128 |
| 45 | 43.4 | 41.4 | 163 |
| 60 | 61.8 | 59 | 180 |
| 75 | 83 | 82.9 | 180 |
| 90 | 92.6 | 89.5 | 180 |
| 105 | 96.5 | 94.4 | 180 |
| 120 | 96.8 | 93.3 | 180 |
| 158 | 80.2 | 77.4 | 180 |
| 180 | 53.8 | 50 | 180 |

TABLE 75

50 ppm Blend 87

| Time, Minutes | Total Calcium, ppm | Inhibited Calcium, ppm | Temperature |
|---|---|---|---|
| 0 | 0 | 0 | 25 |
| 15 | 14.7 | 14.3 | 82 |
| 30 | 29.8 | 29.3 | 128 |
| 45 | 63.2 | 60.8 | 163 |
| 60 | 86.2 | 85.7 | 180 |
| 75 | 111.6 | 111.6 | 180 |
| 90 | 130.4 | 127.6 | 180 |
| 105 | 142.2 | 139.4 | 180 |
| 120 | 141.3 | 137 | 180 |
| 158 | 110.7 | 101.3 | 180 |
| 180 | 67.4 | 60.8 | 180 |

TABLE 76

10 ppm Blend 87

| Time, Minutes | Total Calcium, ppm | Inhibited Calcium, ppm | Temperature |
|---|---|---|---|
| 0 | 0 | 0 | 25 |
| 15 | 18 | 12 | 82 |
| 30 | 36 | 36 | 128 |
| 45 | 60 | 54 | 163 |
| 60 | 66 | 60 | 180 |
| 75 | 42 | 30 | 180 |
| 90 | 30 | 18 | 180 |
| 105 | 24 | 18 | 180 |
| 120 | 18 | 12 | 180 |
| 158 | 12 | 12 | 180 |
| 180 | 12 | 6 | 180 |

The data of Example 20 demonstrates that use levels of 50, 100 and 550 ppm provided significant improvement in calcium inhibition compared to the use of 10 ppm inhibitor or the use of no inhibitor. The data of this example suggests that a blend of Dequest 2060 or 2066 and Dequest 2054 in the use range of about 50 to about 1000 ppm would be effective to inhibit calcium salt scale according to the invention. It is believed that the difference between the data for 50 ppm inhibitor and 100 ppm inhibitor is due to the wood chips used in the experiments. The advantage of using 100 ppm inhibitor compared to 50 ppm inhibitor is seen in the shape of the curve as opposed to the height of the curve.

Example 21

Blend 94 was tested in the Kraft Cook Test described in the Examples section at 500, 100, 50, and 10 ppm active acid. The results are given in Tables 77–80 below.

TABLE 77

500 ppm Blend 94

| Time, Minutes | Total Calcium, ppm | Inhibited Calcium, ppm | Temperature |
|---|---|---|---|
| 0 | 0 | 0 | 21 |
| 15 | 24 | 24 | 90 |
| 30 | 42 | 42 | 136 |
| 45 | 66 | 66 | 174 |
| 60 | 90 | 84 | 178 |
| 75 | 102 | 96 | 178 |
| 90 | 108 | 96 | 178 |
| 105 | 114 | 108 | 178 |
| 120 | 114 | 108 | 178 |
| 150 | 120 | 114 | 178 |
| 180 | 120 | 114 | 178 |

TABLE 78

100 ppm Blend 94

| Time, Minutes | Total Calcium, ppm | Inhibited Calcium, ppm | Temperature |
|---|---|---|---|
| 0 | 0 | 0 | 21 |
| 15 | 18 | 18 | 80 |
| 30 | 30 | 30 | 132 |
| 45 | 48 | 48 | 170 |
| 60 | 60 | 60 | 176 |
| 75 | 72 | 66 | 176 |
| 90 | 78 | 72 | 176 |
| 105 | 84 | 78 | 176 |
| 120 | 84 | 78 | 176 |
| 150 | 84 | 78 | 176 |
| 180 | 78 | 72 | 176 |

TABLE 79

50 ppm Blend 94

| Time, Minutes | Total Calcium, ppm | Inhibited Calcium, ppm | Temperature |
|---|---|---|---|
| 0 | 0 | 0 | 21 |
| 15 | 18 | 18 | 80 |
| 30 | 30 | 30 | 132 |
| 45 | 42 | 42 | 170 |
| 60 | 60 | 60 | 176 |
| 75 | 72 | 72 | 176 |
| 90 | 78 | 78 | 176 |
| 105 | 78 | 72 | 176 |
| 120 | 78 | 78 | 176 |
| 150 | 72 | 60 | 176 |
| 180 | 42 | 42 | 176 |

TABLE 80

10 ppm Blend 94

| Time, Minutes | Total Calcium, ppm | Inhibited Calcium, ppm | Temperature |
|---|---|---|---|
| 0 | 0 | 0 | 21 |
| 15 | 12 | 12 | 80 |
| 30 | 30 | 30 | 132 |
| 45 | 48 | 42 | 170 |

TABLE 80-continued

10 ppm Blend 94

| Time, Minutes | Total Calcium, ppm | Inhibited Calcium, ppm | Temperature |
|---|---|---|---|
| 60 | 66 | 54 | 176 |
| 75 | 66 | 60 | 176 |
| 90 | 48 | 42 | 176 |
| 105 | 36 | 30 | 176 |
| 120 | 30 | 24 | 176 |
| 150 | 24 | 18 | 176 |
| 180 | 24 | 12 | 176 |

The data of Example 21 demonstrates that use levels of 50, 100 and 500 ppm provided significant improvement in calcium inhibition compared to the use of 10 ppm inhibitor or the use of no inhibitor. The data of this example suggests that a blend of Dequest 2000 or 2006 and Dequest 2046 in the use range of about 30 to about 1000 ppm would be effective to inhibit calcium salt scale according to the invention.

Example 22

Blend 95 was tested in the Kraft Cook Test described in the Examples section at 500, 100, 50 and 10 ppm active acid. The results are given in Tables 81–84 below.

TABLE 81

500 ppm Blend 95

| Time, Minutes | Total Calcium, ppm | Inhibited Calcium, ppm | Temperature |
|---|---|---|---|
| 0 | 0 | 0 | 21 |
| 15 | 12 | 12 | 82 |
| 30 | 30 | 30 | 132 |
| 45 | 48 | 48 | 170 |
| 60 | 54 | 54 | 177 |
| 75 | 54 | 54 | 177 |
| 90 | 60 | 54 | 177 |
| 105 | 60 | 54 | 177 |
| 120 | 60 | 60 | 177 |
| 150 | 66 | 60 | 177 |
| 180 | 66 | 60 | 177 |

TABLE 82

100 ppm Blend 95

| Time, Minutes | Total Calcium, ppm | Inhibited Calcium, ppm | Temperature |
|---|---|---|---|
| 0 | 0 | 0 | 21 |
| 15 | 18 | 18 | 80 |
| 30 | 24 | 24 | 132 |
| 45 | 42 | 42 | 170 |
| 60 | 54 | 54 | 176 |
| 75 | 66 | 66 | 176 |
| 90 | 72 | 72 | 176 |
| 105 | 78 | 78 | 176 |
| 120 | 84 | 84 | 176 |
| 150 | 84 | 84 | 176 |
| 180 | 84 | 84 | 176 |

TABLE 83

50 ppm Blend 95

| Time, Minutes | Total Calcium, ppm | Inhibited Calcium, ppm | Temperature |
|---|---|---|---|
| 0 | 0 | 0 | 21 |
| 15 | 6 | 6 | 80 |
| 30 | 24 | 24 | 132 |
| 45 | 42 | 42 | 170 |
| 60 | 54 | 48 | 176 |
| 75 | 60 | 60 | 176 |
| 90 | 66 | 66 | 176 |
| 105 | 66 | 66 | 176 |
| 120 | 72 | 72 | 176 |
| 150 | 72 | 72 | 176 |
| 180 | 72 | 72 | 176 |

TABLE 84

10 ppm Blend 95

| Time, Minutes | Total Calcium, ppm | Inhibited Calcium, ppm | Temperature |
|---|---|---|---|
| 0 | 0 | 0 | 21 |
| 15 | 12 | 12 | 80 |
| 30 | 30 | 30 | 132 |
| 45 | 48 | 48 | 170 |
| 60 | 66 | 66 | 176 |
| 75 | 66 | 60 | 176 |
| 90 | 42 | 36 | 176 |
| 105 | 30 | 30 | 176 |
| 120 | 30 | 24 | 176 |
| 150 | 24 | 18 | 176 |
| 180 | 24 | 18 | 176 |

The data of Example 22 demonstrates that use levels of 50, 100 and 500 ppm provided significant improvement in calcium inhibition compared to the use of 10 ppm inhibitor or the use of no inhibitor. The data of this example suggests that a blend of Dequest 2010 or 2016 and Dequest 2046 in the use range of about 20 to about 1000 ppm would be effective to inhibit calcium salt scale according to the invention.

Example 23

Blend 96 was tested in the Kraft Cook Test described in the Examples section at 500, 100, 50 and 10 ppm active acid. The results are given in Tables 85–88 below.

TABLE 85

500 ppm Blend 96

| Time, Minutes | Total Calcium, ppm | Inhibited Calcium, ppm | Temperature |
|---|---|---|---|
| 0 | 0 | 0 | 21 |
| 15 | 18 | 18 | 88 |
| 30 | 36 | 36 | 136 |
| 45 | 54 | 54 | 172 |
| 60 | 78 | 72 | 174 |
| 75 | 90 | 84 | 174 |
| 90 | 96 | 90 | 174 |
| 105 | 102 | 90 | 174 |
| 120 | 108 | 96 | 174 |
| 150 | 108 | 96 | 174 |
| 180 | 108 | 96 | 174 |

TABLE 86

100 ppm Blend 96

| Time, Minutes | Total Calcium, ppm | Inhibited Calcium, ppm | Temperature |
|---|---|---|---|
| 0 | 0 | 0 | 21 |
| 15 | 12 | 12 | 80 |
| 30 | 30 | 30 | 132 |
| 45 | 48 | 48 | 170 |
| 60 | 60 | 60 | 176 |
| 75 | 66 | 66 | 176 |
| 90 | 72 | 72 | 176 |
| 105 | 78 | 78 | 176 |
| 120 | 84 | 84 | 176 |
| 150 | 84 | 84 | 176 |
| 180 | 84 | 84 | 176 |

TABLE 87

50 ppm Blend 96

| Time, Minutes | Total Calcium, ppm | Inhibited Calcium, ppm | Temperature |
|---|---|---|---|
| 0 | 0 | 0 | 21 |
| 15 | 6 | 6 | 80 |
| 30 | 30 | 30 | 132 |
| 45 | 48 | 48 | 170 |
| 60 | 60 | 60 | 176 |
| 75 | 72 | 72 | 176 |
| 90 | 78 | 72 | 176 |
| 105 | 84 | 78 | 176 |
| 120 | 84 | 84 | 176 |
| 150 | 72 | 48 | 176 |
| 180 | 48 | 42 | 176 |

TABLE 88

10 ppm Blend 96

| Time, Minutes | Total Calcium, ppm | Inhibited Calcium, ppm | Temperature |
|---|---|---|---|
| 0 | 0 | 0 | 21 |
| 15 | 12 | 12 | 80 |
| 30 | 24 | 24 | 132 |
| 45 | 48 | 42 | 170 |
| 60 | 66 | 60 | 176 |
| 75 | 78 | 78 | 176 |
| 90 | 78 | 72 | 176 |
| 105 | 54 | 54 | 176 |
| 120 | 42 | 36 | 176 |
| 150 | 30 | 24 | 176 |
| 180 | 24 | 24 | 176 |

The data of Example 23 demonstrates that use levels of 50, 100 and 500 ppm provided significant improvement in calcium inhibition compared to the use of 10 ppm or the use of no inhibitor. The data of this example suggests that a blend of Dequest 2046 and Dequest 2054 in the use range of about 30 to about 1000 ppm would be effective to inhibit calcium salt scale according to the invention.

Example 24

Blend 97 was tested in the Kraft Cook Test described in the Examples section at 500, 100, 50 and 10 ppm active acid. The results are given in Tables 89–92 below.

TABLE 89

500 ppm Blend 97

| Time, Minutes | Total Calcium, ppm | Inhibited Calcium, ppm | Temperature |
|---|---|---|---|
| 0 | 0 | 0 | 21 |
| 15 | 24 | 24 | 86 |
| 30 | 36 | 36 | 134 |
| 45 | 66 | 60 | 172 |
| 60 | 84 | 78 | 174 |
| 75 | 96 | 90 | 174 |
| 90 | 102 | 96 | 174 |
| 105 | 114 | 108 | 174 |
| 120 | 114 | 108 | 174 |
| 150 | 114 | 108 | 174 |
| 180 | 114 | 108 | 174 |

TABLE 90

100 ppm Blend 97

| Time, Minutes | Total Calcium, ppm | Inhibited Calcium, ppm | Temperature |
|---|---|---|---|
| 0 | 0 | 0 | 21 |
| 15 | 18 | 18 | 80 |
| 30 | 30 | 30 | 132 |
| 45 | 48 | 48 | 170 |
| 60 | 54 | 54 | 176 |
| 75 | 60 | 60 | 176 |
| 90 | 66 | 66 | 176 |
| 105 | 72 | 72 | 176 |
| 120 | 72 | 72 | 176 |
| 150 | 72 | 72 | 176 |
| 180 | 72 | 72 | 176 |

TABLE 91

50 ppm Blend 97

| Time, Minutes | Total Calcium, ppm | Inhibited Calcium, ppm | Temperature |
|---|---|---|---|
| 0 | 0 | 0 | 21 |
| 15 | 18 | 18 | 80 |
| 30 | 30 | 30 | 132 |
| 45 | 48 | 48 | 170 |
| 60 | 60 | 60 | 176 |
| 75 | 72 | 72 | 176 |
| 90 | 72 | 72 | 176 |
| 105 | 72 | 66 | 176 |
| 120 | 72 | 72 | 176 |
| 150 | 66 | 66 | 176 |
| 180 | 54 | 54 | 176 |

TABLE 92

10 ppm Blend 97

| Time, Minutes | Total Calcium, ppm | Inhibited Calcium, ppm | Temperature |
|---|---|---|---|
| 0 | 0 | 0 | 21 |
| 15 | 12 | 12 | 80 |
| 30 | 30 | 30 | 132 |
| 45 | 48 | 48 | 170 |
| 60 | 66 | 66 | 176 |
| 75 | 72 | 66 | 176 |
| 90 | 60 | 54 | 176 |
| 105 | 48 | 42 | 176 |
| 120 | 36 | 30 | 176 |
| 150 | 30 | 24 | 176 |
| 180 | 24 | 18 | 176 |

The data of Example 24 demonstrates that use levels of 50, 100 and 550 ppm provided significant improvement in calcium inhibition compared to the use of 10 ppm or the use of no inhibitor. The data of this example suggests that a blend of Dequest 2060 or 2066 and Dequest 2046 in the use range of about 20 to about 1000 ppm would be effective to inhibit calcium salt scale according to the invention.

Example 25

Blend 98 was tested in the Kraft Cook Test described in the Examples section at 500, 100, 50 and 10 ppm active acid. The results are given in Tables 93–96 below.

TABLE 93

500 ppm Blend 98

| Time, Minutes | Total Calcium, ppm | Inhibited Calcium, ppm | Temperature |
|---|---|---|---|
| 0 | 0 | 0 | 21 |
| 15 | 24 | 24 | 84 |
| 30 | 42 | 42 | 132 |
| 45 | 60 | 60 | 168 |
| 60 | 90 | 90 | 180 |
| 75 | 96 | 96 | 180 |
| 90 | 102 | 102 | 180 |
| 105 | 102 | 102 | 180 |
| 120 | 102 | 102 | 180 |
| 150 | 102 | 102 | 180 |
| 180 | 102 | 102 | 180 |

TABLE 94

100 ppm Blend 98

| Time, Minutes | Total Calcium, ppm | Inhibited Calcium, ppm | Temperature |
|---|---|---|---|
| 0 | 0 | 0 | 21 |
| 15 | 18 | 18 | 80 |
| 30 | 30 | 30 | 132 |
| 45 | 42 | 42 | 170 |
| 60 | 54 | 54 | 176 |
| 75 | 66 | 66 | 176 |
| 90 | 66 | 66 | 176 |
| 105 | 72 | 72 | 176 |
| 120 | 72 | 72 | 176 |
| 150 | 72 | 72 | 176 |
| 180 | 72 | 72 | 176 |

TABLE 95

50 ppm Blend 98

| Time, Minutes | Total Calcium, ppm | Inhibited Calcium, ppm | Temperature |
|---|---|---|---|
| 0 | 0 | 0 | 21 |
| 15 | 12 | 12 | 80 |
| 30 | 24 | 24 | 132 |
| 45 | 42 | 42 | 170 |
| 60 | 60 | 60 | 176 |
| 75 | 66 | 66 | 176 |
| 90 | 72 | 72 | 176 |
| 105 | 72 | 72 | 176 |
| 120 | 78 | 78 | 176 |
| 150 | 72 | 72 | 176 |
| 180 | 66 | 66 | 176 |

TABLE 96

10 ppm Blend 98

| Time, Minutes | Total Calcium, ppm | Inhibited Calcium, ppm | Temperature |
|---|---|---|---|
| 0 | 0 | 0 | 21 |
| 15 | 12 | 12 | 80 |
| 30 | 30 | 30 | 132 |
| 45 | 48 | 48 | 170 |
| 60 | 66 | 60 | 176 |
| 75 | 78 | 72 | 176 |
| 90 | 72 | 72 | 176 |
| 105 | 66 | 66 | 176 |
| 120 | 54 | 54 | 176 |
| 150 | 36 | 36 | 176 |
| 180 | 24 | 24 | 176 |

The data of Example 25 demonstrates that use levels of 50, 100 and 500 ppm provided significant improvement in calcium inhibition compared to the use of 10 ppm or the use of no inhibitor. The data of this example suggests that a blend of Dequest 2046 and 4 NHMP in the use range of about 20 to about 1000 ppm would be effective to inhibit calcium salt scale according to the invention.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims. It is further intended that each and every claim limitation be literally construed to include any and all variants which are insubstantially different from what is literally recited except variants which are in the prior art.

What is claimed is:

1. A method for inhibiting calcium salt scale formation in chemical pulping processes comprising adding an effective scale inhibiting amount of at least one phosphonate to the alkaline aqueous mixture in the digester of said chemical pulping process, wherein said at least one phosphonate is selected from compounds having the formula:

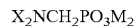

$$X_2NCH_2PO_3M_2 \quad (I),$$

compounds having the formula:

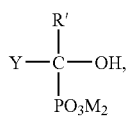

(II)

$$Y-\underset{\underset{PO_3M_2}{|}}{\overset{\overset{R'}{|}}{C}}-OH,$$

amine oxides of phosphonates of formula (I), or mixtures thereof;
wherein M is independently selected from hydrogen, alkali metal, alkaline earth metal or ammonium, X is independently selected from H, R, or —$CH_2PO_3M_2$ wherein R is an alkyl group or —$NX_2$ substituted alkyl group having 2 to 6 carbon atoms, R' is an alkyl group having 1 to 17 carbon atoms and R' is optionally branched and optionally unsaturated, and Y is selected from —$PO_3M_2$, H or R';
with the proviso that:
a) said scale inhibiting composition does not contain a nonionic surfactant, and
b) that when said phosphonate is only $N(CH_2PO_3M_2)_3$, the amount of said phosphonate on an active acid basis in the range of from about 500 to about 1000 ppm based on the weight of total liquor charged to said digester.

2. The method of claim 1 wherein M is independently selected from hydrogen or an alkali metal.

3. The method of claim 2 wherein M is sodium or potassium when M is an alkali metal.

4. The method of claim 1 wherein X is independently selected from $—CH_2PO_3M_2$ or R.

5. The method of claim 4 wherein at least one of X is R and R is $—(CH_2)_nNX'_2$, wherein n is an integer from 2 to 6 and X' is independently selected from R or $—CH_2PO_3M_2$.

6. The method of claim 5 wherein R' is an alkyl group having 1 to 5 carbon atoms.

7. The method of claim 4 wherein each X is R and R is $—(CH_2)_nNX'_2$, wherein n is an integer from 2 to 6 and X' is independently selected from R or $—CH_2PO_3M_2$.

8. The method of claim 1 wherein Y is $—PO_3M_2$.

9. The method of claim 1 wherein said phosphonate is at least one phosphonate of formula (I).

10. The method of claim 9 wherein said phosphonate is $N(CH_2PO_3M_2)_3$ and the amount of said phosphonate on an active acid basis is about 600 to about 800 ppm based on the weight of total liquor charged to said digester.

11. The method of claim 9 wherein said phosphonate is $(M_2O_3PCH_2)_2NCH_2CH_2N(CH_2PO_3M_2)_2$.

12. The method of claim 11 wherein the amount of said phosphonate on an active acid basis is about 10 to about 1000 ppm based on the weight of total liquor charged to said digester.

13. The method of claim 12 wherein the amount of said phosphonate on an active acid basis is about 150 to about 1000 ppm based on the weight of total liquor charged to said digester.

14. The method of claim 9 wherein said phosphonate is $(M_2O_3PCH_2)_2N(CH_2)_6N(CH_2PO_3M_2)_2$.

15. The method of claim 9 wherein said phosphonate is $(M_2O_3PCH_2)_2NCH_2CH_2N(CH_2PO_3M_2)CH_2CH_2N(CH_2PO_3M_2)_2$ and the amount of said phosphonate on an active acid basis is about 30 to about 1000 ppm based on the weight of total liquor charged to said digester.

16. The method of claim 9 wherein said phosphonate is $(M_2O_3PCH_2)_2NCH_2CH_2CH_2N(CH_2PO_3M_2)CH_2CH_2N(CH_2PO_3M_2)CH_2CH_2CH_2N—(CH_2PO_3M_2)_2$.

17. The method of claim 16 wherein the amount of said phosphonate on an active acid basis is about 10 to about 1000 ppm based on the weight of total liquor charged to said digester.

18. The method of claim 1 wherein said phosphonate is at least one phosphonate of formula (II).

19. The method of claim 18 wherein said phosphonate is $CH_3C(OH)(PO_3M_2)_2$.

20. The method of claim 19 wherein the amount of said phosphonate on an active acid basis is about 20 to about 200 ppm based on the weight of total liquor charged to said digester.

21. The method of claim 1 wherein said phosphonate is a mixture of at least two phosphonates of formula (I).

22. The method of claim 21 wherein said phosphonate is a mixture of: $(M_2O_3PCH_2)_2NCH_2CH_2CH_2N(CH_2PO_3M_2)CH_2CH_2N(CH_2PO_3M_2)CH_2CH_2CH_2—N(CH_2PO_3M_2)_2$, and a second phosphonate selected from $N(CH_2PO_3M_2)_3$, $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$.

23. The method of claim 22 wherein said second phosphonate is $N(CH_2PO_3M_2)_3$, and the amount of said mixture on an active acid basis is about 10 to about 1000 ppm based on the weight of total liquor charged to said digester.

24. The method of claim 22 wherein said second phosphonate is $(M_2O_3PCH_2)_2NCH_2CH_2N(CH_2PO_3M_2)_2$, and the amount of said mixture on an active acid basis is about 20 to about 1000 ppm based on the weight of total liquor charged to said digester.

25. The method of claim 22 wherein said second phosphonate is $(M_2O_3PCH_2)_2N(CH_2)_6N(CH_2PO_3M_2)_2$, and the amount of said mixture on an active acid basis is about 80 to about 1000 ppm based on the weight of total liquor charged to said digester.

26. The method of claim 22 wherein said second phosphonate is $(M_2O_3PCH_2)_2NCH_2CH_2N(CH_2PO_3M_2)CH_2CH_2N(CH_2PO_3M_2)_2$, and the amount of said mixture on an active acid basis is about 10 to about 1000 ppm based on the weight of total liquor charged to said digester.

27. The method of claim 21 wherein said phosphonate is a mixture of $(M_2O_3PCH_2)_2N(CH_2)_6N(CH_2PO_3M_2)_2$ and $(M_2O_3PCH_2)_2NCH_2CH_2N(CH_2PO_3M_2)CH_2CH_2N(CH_2PO_3M_2)_2$.

28. The method of claim 27 wherein the amount of said mixture on an active acid basis is about 50 to about 1000 ppm based on the weight of total liquor charged to said digester.

29. The method of claim 21 wherein said phosphonate is a mixture of $(M_2O_3PCH_2)_2NCH_2CH_2N(CH_2PO_3M_2)_2$ and a second phosphonate selected from $(M_2O_3PCH_2)_2N(CH_2)_6N(CH_2PO_3M_2)_2$, $(M_2O_3PCH_2)_2NCH_2CH_2N(CH_2PO_3M_2)CH_2CH_2N(CH_2PO_3M_2)_2$, or $N(CH_2PO_3M_2)_3$.

30. The method of claim 29 wherein said second phosphonate is selected from $(M_2O_3PCH_2)_2N(CH_2)_6N(CH_2PO_3M_2)_2$, or $N(CH_2PO_3M_2)_3$, and the amount of said mixture on an active acid basis is about 30 to about 1000 ppm based on the weight of total liquor charged to said digester.

31. The method of claim 29 wherein said second phosphonate is $(M_2O_3PCH_2)_2NCH_2CH_2N(CH_2PO_3M_2)CH_2CH_2N(CH_2PO_3M_2)_2$, and the amount of said mixture on an active acid basis is about 20 to about 1000 ppm based on the weight of total liquor charged to said digester.

32. The method of claim 21 wherein said phosphonate is a mixture of $(M_2O_3PCH_2)_2N(CH_2)_6N(CH_2PO_3M_2)_2$ and $N(CH_2PO_3M_2)_3$, and the amount of said mixture on an active acid basis is about 100 to about 1000 ppm based on the weight of total liquor charged to said digester.

33. The method of claim 21 wherein said phosphonate is a mixture of $N(CH_2PO_3M_2)_3$ and $(M_2O_3PCH_2)_2NCH_2CH_2N(CH_2PO_3M_2)CH_2CH_2N(CH_2PO_3M_2)_2$, and the amount of said mixture on an active acid basis is about 50 to about 1000 ppm based on the weight of total liquor charged to said digester.

34. The method of claim 1 wherein said phosphonate is a mixture of at least one phosphonate of formula (I) and at least one phosphonate of formula (II).

35. The method of claim 34 wherein said phosphonate is a mixture of a first phosphonate selected from $(M_2O_3PCH_2)_2NCH_2CH_2N(CH_2PO_3M_2)_2$, $(M_2O_3PCH_2)_2NCH_2CH_2N(CH_2PO_3M_2)CH_2CH_2N(CH_2PO_3M_2)_2$, $(M_2O_3PCH_2)_2NCH_2CH_2CH_2N(CH_2PO_3M_2)CH_2CH_2N—(CH_2PO_3M_2)_2$, $(M_2O_3PCH_2)_2N(CH_2)_6N(CH_2PO_3M_2)_2$ or $(M_2O_3PCH_2)_2NCH_2CH_2N(CH_2PO_3M_2)CH_2CH_2N(CH_2PO_3M_2)_2$, and a second phosphonate selected from $CH_3C(OH)(PO_3M_2)_2$.

36. The method of claim 35 wherein said first phosphonate is $(M_2O_3PCH_2)_2NCH_2CH_2N(CH_2PO_3M_2)_2$, and the amount of said mixture on an active acid basis is about 20 to about 1000 ppm based on the weight of total liquor charged to said digester.

37. The method of claim 35 wherein said first phosphonate is $(M_2O_3PCH_2)_2NCH_2CH_2CH_2N(CH_2PO_3M_2)CH_2CH_2N(CH_2PO_3M_2)CH_2CH_2CH_2N—(CH_2PO_3M_2)_2$, and the amount of said mixture on an active acid basis is about 20 to about 500 ppm based on the weight of total liquor charged to said digester.

38. The method of claim 35 wherein said first phosphonate is $(M_2O_3PCH_2)_2NCH_2CH_2N(CH_2PO_3M_2)CH_2CH_2N(CH_2PO_3M_2)_2$, and the amount of said mixture on an active acid basis is about 30 to about 1000 ppm based on the weight of total liquor charged to said digester.

39. The method of claim 35 wherein said first phosphonate is $(M_2O_3PCH_2)_2N(CH_2)_6N(CH_2PO_3M_2)_2$ and the amount of said mixture on an active acid basis is about 30 to about 150 ppm based on the weight of total liquor charged to said digester.

40. The composition of claim 34 wherein said phosphonate is a mixture of $N(CH_2PO_3M_2)_3$, and $CH_3C(OH)(PO_3M_2)_2$, and the amount of said mixture on an active acid basis is about 30 to about 500 ppm based on the weight of total liquor charged to said digester.

41. The method of claim 1 wherein said phosphonate is a mixture of at least two phosphonates of formula (II).

42. The method of claim 1 wherein said chemical pulping process is a Kraft process.

43. The method of claim 42 wherein calcium salt scale is inhibited in the digester.

44. The method of claim 42 wherein calcium salt scale is inhibited in the brown stock washing area.

45. The method of claim 42 wherein calcium salt scale is inhibited in the black liquor recovery area.

46. The method of claim 1 wherein said calcium salt is calcium carbonate or calcium sulfate.

47. The method of claim 46 wherein said calcium salt is calcium carbonate.

48. The method of claim 1 wherein the pH of said alkaline aqueous mixture is at least 9.

49. A method for inhibiting calcium salt scale formation in an aqueous system in a chemical pulping process having a sufficient quantity of available calcium cations and anions selected from carbonate and sulfate susceptible to form said calcium salt scale, comprising admixing an effective scale inhibiting amount of at least one phosphonate with said aqueous system in the digester of said chemical pulping process maintained in a temperature range to inhibit calcium salt scale formation; and wherein said phosphonate is selected from compounds having the formula:

$$X_2NCH_2PO_3M_2 \quad (I),$$

compounds having the formula:

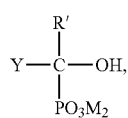

$$(II)$$
$$Y—\underset{\underset{PO_3M_2}{|}}{\overset{\overset{R'}{|}}{C}}—OH,$$

amine oxides of phosphonates of formula (I),
or mixtures thereof;
wherein M is independently selected from hydrogen, alkali metal, alkaline earth metal or ammonium, X is independently selected from H, R, or —$CH_2PO_3M_2$ wherein R is an alkyl group or —$NX_2$ substituted alkyl group having 2 to 6 carbon atoms, R' is an alkyl group having 1 to 17 carbon atoms and R' is optionally branched and optionally unsaturated, and Y is selected from —$PO_3M_2$, H or R';
with the proviso that:
a) said scale inhibiting composition does not contain a nonionic surfactant, and
b) that when said phosphonate is only $N(CH_2PO_3M_2)_3$, the amount of said phosphonate on an active acid basis is in the range of from about 500 to about 1000 ppm based on the weight of total liquor charged to said digester.

50. A method for inhibiting calcium salt scale formation in an aqueous system in a selected chemical pulping process comprising:
(a) determining the calcium salt scale inhibition profiles of phosphonate concentration and process temperature as a function of time for phosphonate compositions admixed with the aqueous digester composition in a chemical pulping process digester,
(b) identifying the calcium salt scale inhibition capability required by said selected chemical pulping process based on the process operating conditions of time, temperature and pressure, and the aqueous digester composition,
(c) selecting the appropriate phosphonate composition and phosphonate use concentration to effectively inhibit calcium salt scale formation in said selected chemical pulping process when said phosphonate is admixed with the aqueous digester composition in said selected chemical pulping process based on steps (a) and (b), and
(d) admixing the selected phosphonate composition with the aqueous digester composition in said selected chemical pulping process during the digestion stage of the chemical pulping process;
wherein said selected phosphonate composition is at least one phosphonate selected from compounds having the formula:

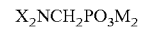
$$X_2NCH_2PO_3M_2 \quad (I),$$

compounds having the formula:

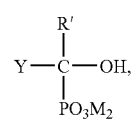

$$(II)$$
$$Y—\underset{\underset{PO_3M_2}{|}}{\overset{\overset{R'}{|}}{C}}—OH,$$

amine oxides of phosphonates of formula (I),
or mixtures thereof;
wherein M is independently selected from hydrogen, alkali metal, alkaline earth metal or ammonium, X is independently selected from H, R, or —$CH_2PO_3M_2$ wherein R is an alkyl group or —$NX_2$ substituted alkyl group having 2 to 6 carbon atoms, R' is an alkyl group having 1 to 17 carbon atoms and R' is optionally branched and optionally unsaturated, and Y is selected from —$PO_3M_2$, H or R';
with the proviso that:
a) said scale inhibiting composition does not contain a nonionic surfactant, and
b) that when said phosphonate is only $N(CH_2PO_3M_2)_3$, the amount of said phosphonate on an active acid basis is in the range of from about 500 ppm to about 1000 ppm based on the weight of total liquor charged to said digester.

51. A method for inhibiting calcium salt scale formation in an aqueous system in a selected chemical pulping process comprising:
(a) identifying the calcium salt scale inhibition capability required by said selected chemical pulping process based on the process operating conditions of time, temperature and pressure, and the aqueous digester composition,
(b) selecting the appropriate phosphonate composition and phosphonate use concentration to effectively inhibit calcium salt scale formation in said selected chemical pulping process when said phosphonate is admixed with the aqueous digester composition in said selected chemical pulping process based on step (a) and the calcium salt scale inhibition profiles of phosphonate concentration and process temperature as a function of time for phosphonate compositions admixed with the aqueous digester composition in a chemical pulping process digester, and
(c) admixing the selected phosphonate composition with the aqueous digester composition in said selected chemical pulping process during the digestion stage of the chemical pulping process;

wherein said selected phosphonate composition is at least one phosphonate selected from compounds having the formula:

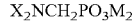 (I), compounds having the formula:

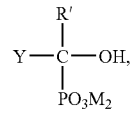 (II)

amine oxides of phosphonates of formula (I), or mixtures thereof;

wherein M is independently selected from hydrogen, alkali metal, alkaline earth metal or ammonium, X is independently selected from H, R, or —$CH_2PO_3M_2$ wherein R is an alkyl group or —$NX2$ substituted alkyl group having 2 to 6 carbon atoms, R' is an alkyl group having 1 to 17 carbon atoms and R' is optionally branched and optionally unsaturated, and Y is selected from —$PO_3M_2$, H or R';

with the proviso that:
a) said scale inhibiting composition does not contain a nonionic surfactant, and
b) that when said phosphonate is only $N(CH_2PO_3M_2)_3$, the amount of said phosphonate on an active acid basis is in the range of from about 500 ppm to about 1000 ppm based on the weight of total liquor charged to said digester.

* * * * *